United States Patent
Richins

(10) Patent No.: US 10,684,534 B2
(45) Date of Patent: Jun. 16, 2020

(54) PRODUCTION EQUIPMENT SUPPORT ASSEMBLY

(71) Applicant: Light-Path, LLC, Orem, UT (US)

(72) Inventor: Russell D. Richins, Orem, UT (US)

(73) Assignee: Light-Path, LLC, Orem, UT (US)

( * ) Notice: Subject to any disclaimer, the term of this patent is extended or adjusted under 35 U.S.C. 154(b) by 0 days.

(21) Appl. No.: 15/961,863

(22) Filed: Apr. 24, 2018

(65) Prior Publication Data

US 2018/0373126 A1 Dec. 27, 2018

Related U.S. Application Data

(60) Provisional application No. 62/489,412, filed on Apr. 24, 2017.

(51) Int. Cl.
| | |
|---|---|
| *G03B 17/56* | (2006.01) |
| *F16M 13/02* | (2006.01) |
| *F16M 11/04* | (2006.01) |
| *G03B 15/07* | (2006.01) |
| *G03B 15/02* | (2006.01) |

(52) U.S. Cl.
CPC ......... *G03B 17/561* (2013.01); *F16M 11/041* (2013.01); *F16M 13/02* (2013.01); *F16M 13/022* (2013.01); *G03B 15/07* (2013.01); *F16M 2200/08* (2013.01); *G03B 15/02* (2013.01)

(58) Field of Classification Search
CPC .... G03B 17/561; G03B 15/02; F16M 13/022; F16M 2200/08
USPC ......... 248/155.3, 429, 432, 244, 298.1, 307, 248/309.2, 346.03
See application file for complete search history.

(56) References Cited

U.S. PATENT DOCUMENTS

| | | | | |
|---|---|---|---|---|
| 4,815,734 | A * | 3/1989 | Verhulst | A63B 63/083 248/297.21 |
| 5,018,468 | A * | 5/1991 | Peterson | B63B 35/7936 114/39.19 |
| 6,332,780 | B1 * | 12/2001 | Traxel | A61B 17/7083 434/267 |
| 6,536,731 | B1 * | 3/2003 | Tegland | F16M 11/041 211/100 |
| 8,100,552 | B2 | 1/2012 | Spero | |
| 9,314,084 | B2 * | 4/2016 | Maldonado | A61M 35/00 |
| 9,809,041 | B1 * | 11/2017 | Lin | B41J 2/145 |
| 2015/0289662 | A1 * | 10/2015 | Iulita | A63F 13/285 297/344.1 |
| 2018/0107094 | A1 * | 4/2018 | Yowler | G03B 15/02 |
| 2019/0127084 | A1 * | 5/2019 | Yau | H04N 5/2251 |
| 2019/0236919 | A1 * | 8/2019 | Mehdi | F16M 11/041 |

FOREIGN PATENT DOCUMENTS

CN 205449295 U 8/2016

* cited by examiner

*Primary Examiner* — Muhammad Ijaz

(57) ABSTRACT

An equipment mounting assembly, such as a skid plate, for mounting and supporting motion picture production and other similar equipment without fasteners. The equipment mounting assembly can comprise a fixture mount having a mounting terminus defining a coupling interface; a mount support base having an upper surface; and a retention system operable to selectively and releasably secure the fixture mount about the mount support base. The retention system can comprise a position keep system, such that the fixture mount can be movable about the mount support base once secured within the retention system.

46 Claims, 9 Drawing Sheets

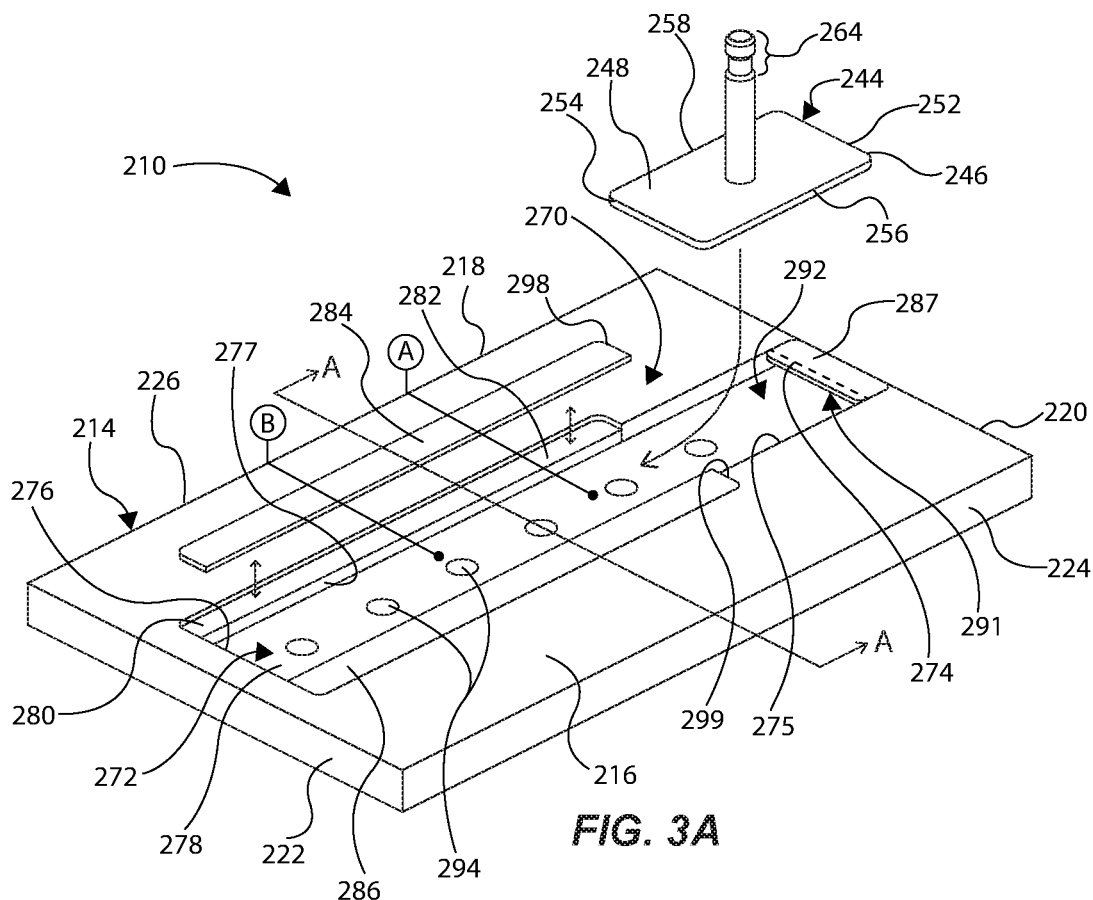
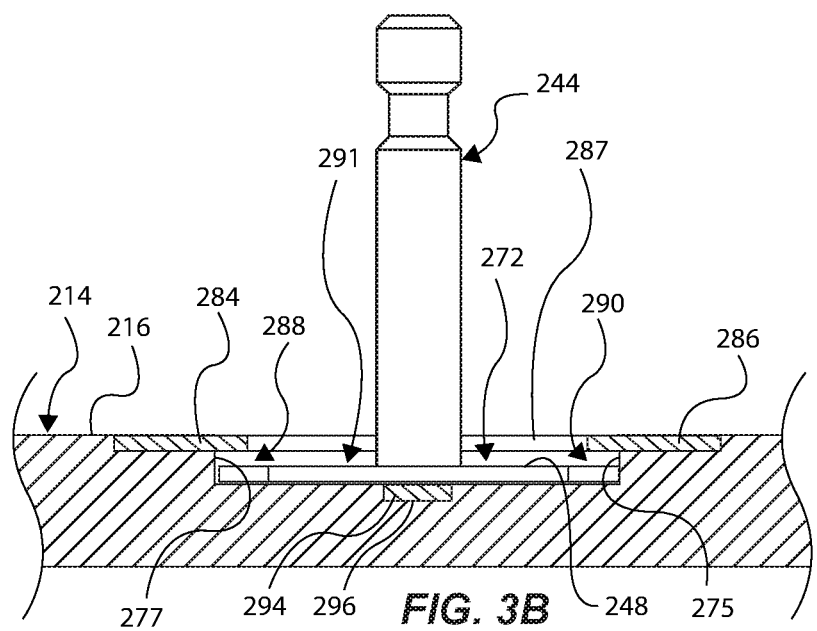

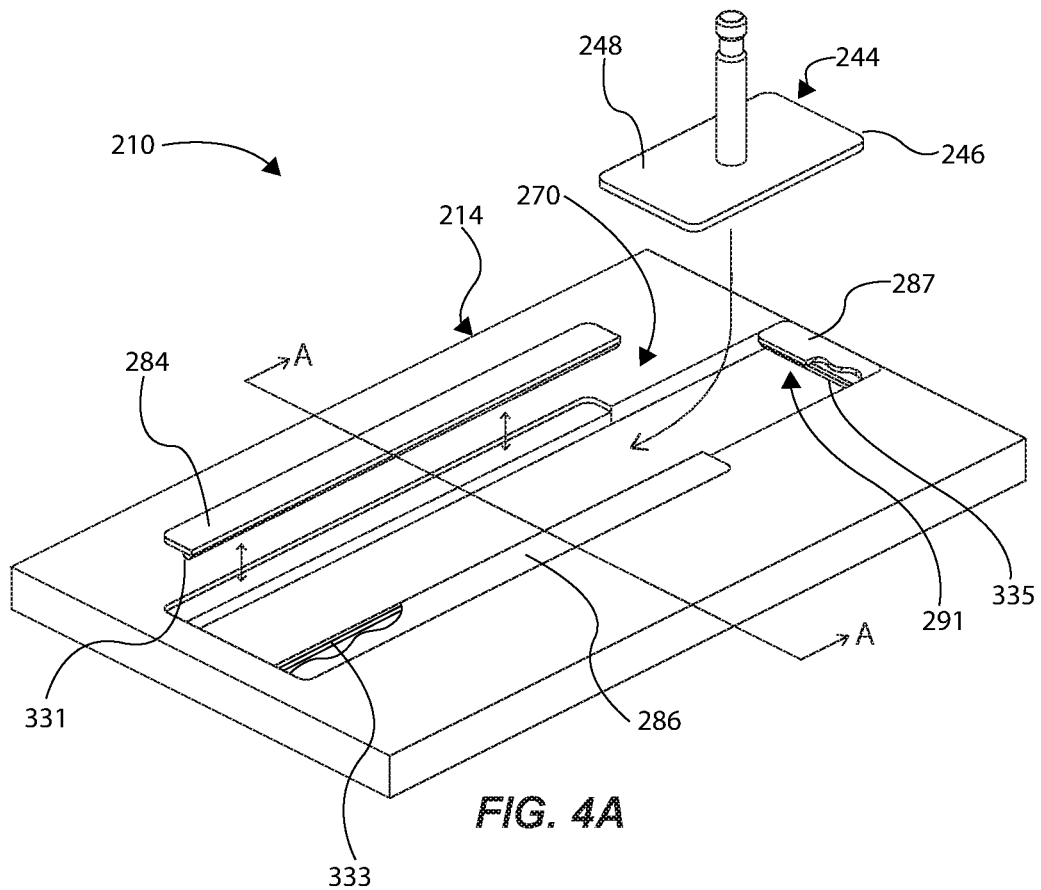
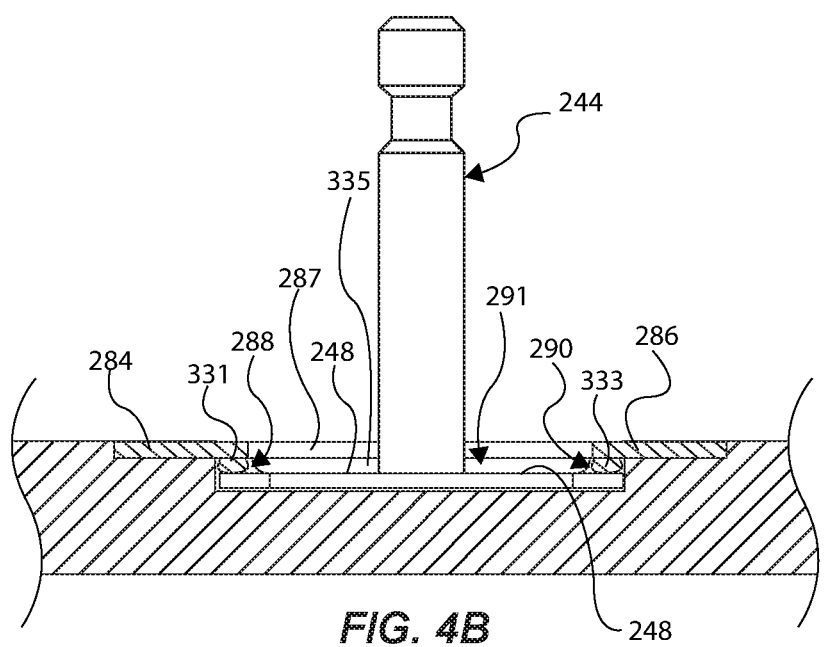
FIG. 4A
FIG. 4B

PRODUCTION EQUIPMENT SUPPORT ASSEMBLY

RELATED APPLICATIONS

This application claims the benefit of U.S. Provisional Patent Application Ser. No. 62/489,412, filed Apr. 24, 2017, and entitled, "Production Equipment Support Assembly," which is incorporated by reference herein in its entirety.

BACKGROUND

Motion picture and photography industries utilize many unique and specialized rigging, mounting, and support devices, assemblies and/or systems for mounting or otherwise securing camera, lighting, special effects, and other motion picture production and photography fixtures and equipment for use on a film or movie set, a stage, or in other types of production or photography settings. Many of these devices, assemblies and/or systems are small and portable, and serve to meet needs and to be used in situations that can be temporary, that can be unexpected, or that cannot be otherwise fulfilled by other equipment. One example of such an assembly is a skid plate for releasably coupling and supporting various fixtures and other equipment, such as a light fixture, wherein the skid plate and the supported light fixture can be positioned and repositioned about, for example, a motion picture production set. As is known, the skid plate can comprise a base mount or platform, sometimes referred to as an apple box, and a fixture mount, such as a pin plate that has been secured or mounted to the apple box, and that comprises a structure and interface configured to releasably couple the light or other fixture. Typically, the pin plate is mounted to the apple box using fasteners.

While mounting a pin plate to an apple box with fasteners can be carried out to construct a skid plate, there are several attendant disadvantages and inefficiencies that exist. Typically, with the use of fasteners the mounting process involves obtaining a tool, such as a power tool, capable of driving screws; selecting both a pin plate and an apple box; obtaining a plurality of screws to be used, typically those that are ¾" to 1" in length; positioning the pin plate on the apple box at the desired location; securing and/or steadying the apple box; aligning the screws with the holes in the plate portion or base plate of the pin plate, and driving in the plurality of screws, being careful not to overdrive them. As can be seen, this mounting process can be quite involved and time consuming. Indeed, it is not uncommon for this mounting process to take between 30 and 90 seconds depending upon the experience and skill of the operator, as well as the number of skid plates to be constructed or built. This can significantly slow down the production and disrupt the workflow taking place on the set or stage, particularly in the event a request is made for a specifically configured skid plate. In addition, once assembled together to form a skid plate, the pin plate and the apple box combination has a reduced, dedicated function with neither the apple box nor the pin plate being able to serve in any of its other, varied functional until the reverse process is undergone and the pin plate and apple box disassembled. The removal process is the reverse of the mounting process, and even though the reversal process can be carried out in slightly less time, this process still can take between 30-40 seconds or more to complete. Another disadvantage that comes from mounting the pin plate to the apple box using fasteners is that the specific placement of the pin plate on the apple box cannot be changed without disassembling the skid plate and remounting the pin plate in a different position, thus requiring even more operator time. Moreover, the repositioning of the pin plate about the apple box in this manner would also require the removal of any production or other equipment being supported by the skid plate. Still another disadvantage is that the mounting is somewhat destructive to the apple box as the fasteners are required to be driven into the typically wood material of the apple box. Upon their removal, the apple box is left with several holes. Over time as multiple mounting and demounting events occur, the apple box can become broken or chipped and eventually worn out. Other disadvantages to current skid plate construction practices that are not specifically discussed herein will be apparent to those skilled in the art.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3A illustrates an isometric view of an equipment mounting assembly in accordance with an example of the present disclosure;

FIG. 3B illustrates a partial cross-sectional front view of the equipment mounting assembly of FIG. 3A (with the fixture mount shown in full), taken along section A-A;

FIG. 4A illustrates an isometric view of the equipment mounting assembly of FIG. 3A comprising an alternative position keep system in accordance with an example of the present disclosure;

FIG. 4B illustrates a partial cross-sectional front view of the equipment mounting assembly of FIG. 4A (with the fixture mount shown in full), taken along section A-A;

Figure 1:
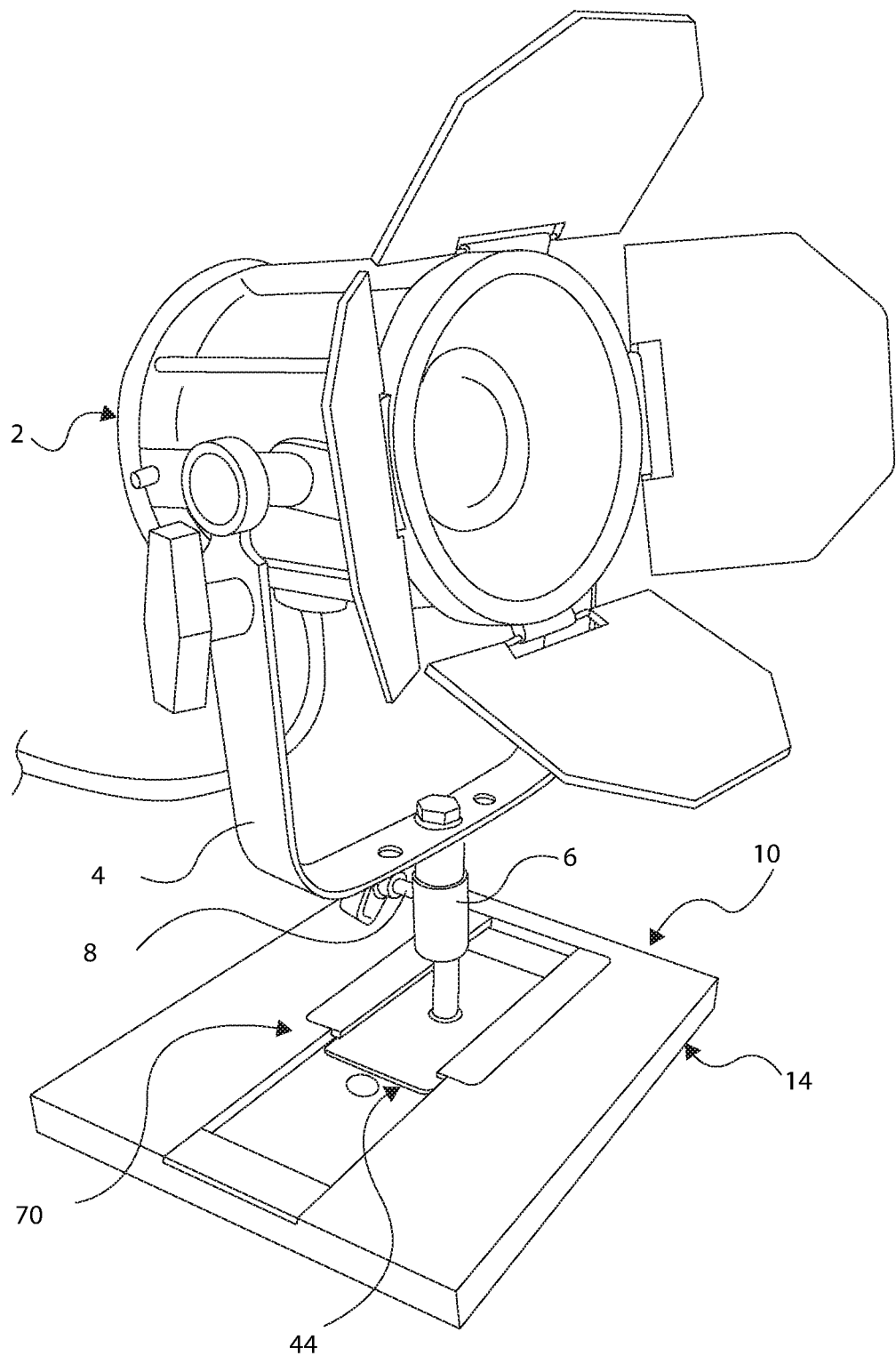
FIG. 1 illustrates a perspective view of an equipment mounting assembly in support of a lighting fixture, in accordance with one example of the present disclosure.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

At the outset, several unique terms and phrases will be defined and discussed in order to provide a better understanding of the present technology. What are largely unique to the motion picture and photography industries, specialized rigging, mounting and support devices, assemblies and systems exist for mounting or otherwise securing camera, lighting, special effects, and other motion picture production and photography fixtures and/or equipment (generally referred to herein as production fixtures and/or equipment) for use on a film or movie set, a stage, or in other types of production or photography settings. While there are several of such specialized rigging, mounting and support devices and systems within the motion picture production industry, the present technology centers around a select few.

There are two types of standard coupling interfaces that allow lighting, camera, special effects and other motion picture production fixtures and/or equipment to interchangeably and releasably couple to a variety of rigging or mounting and support devices and assemblies. These two types are distinguished by the size (e.g., diameter) of each of the coupling interfaces. The smaller of the two coupling interfaces comprises a ⅝ inch diameter and can be referred to as a "baby" sized coupling interface. For example, fixtures (e.g., light fixtures) that are manufactured with a ⅝ inch female receiver for attaching to a ⅝ inch mounting pin are known as "baby" fixtures. The larger of the two coupling interfaces comprises a 1⅛ inch diameter, and can be referred to as a "junior" sized coupling interface. Of course, other sizes and cross-sectional shapes (other than round) may exist, particularly as may exist within motion picture production industries of different countries, all of which are contemplated herein. Nonetheless, reference to these two coupling interface sizes, which are standard across the motion picture industry in the United States, will be made herein to set forth the present technology.

A "baby pin" can refer to a pin-type device or structure having a shaft or post having a mounting terminus defining and providing a first type of coupling interface (e.g., a male-type of coupling interface) of a baby size for mounting baby fixtures or other equipment. A "baby receiver" can refer to a receiver-type device or structure also having a shaft or post, the difference being that the post comprises a mounting terminus defining and providing a second type of coupling interface (e.g., a female-type of coupling interface) of a baby size for mounting baby fixtures or other equipment. A "junior pin" and a "junior receiver" can refer to similarly configured devices, respectively, but that instead provide a junior sized coupling interface for mounting junior motion picture production fixtures or other equipment.

A "baby plate" can refer to and comprise a baby pin or a baby receiver affixed or otherwise secured to or integrally formed with a base plate or base plate-type device, such as a low-profile or thin plate, to provide hardware for mounting fixtures and other equipment to an equipment mount support base. The plate can comprise different shapes and sizes, the most common being a rounded rectangle, and can be comprised of different materials, the most common being steel. In one example, a first end of the shaft or post of the baby pin or baby receiver can be welded to the plate, and can extend outward from an upper surface of the plate either along a normal axis, or along an axis having an angle of inclination, each being relative to a planar orientation of the surface of the plate. A baby plate can be known by alternative names, such as a "baby nail-on," a "750 Pigeon," or simply a "nail-on" or a "nail-on plate." A "junior plate" can be similarly configured to comprise a junior pin or a junior receiver affixed or otherwise secured to a base plate, such as a low-profile or thin plate, and can be referred to by similar alternative names. Cheater plates are also common, and comprise a plate or plate-like structure having a pin extending from the surface of the plate on an angle or incline. All of these different types may be referred to collectively as "pin plates," and a pin plate can comprise, along with the plate or plate-like structure, a shaft or post having a mounting terminus defining a coupling interface (e.g., a male or female type coupling interface). It is noted that other types of plate-like structures or devices operable to provide a base in support of a pin or receiver (or other structure, device, etc.), that are not necessarily referred to or configured as baby or junior plates, are contemplated, and as such, any reference to a baby plate or junior plate herein is not intended to be limiting in any way, as will be recognized by those skilled in the art.

An "apple box" can refer generally to a type of equipment mount support base, or in other words a support base operable to releasably couple and support a fixture mount for supporting motion picture production fixtures or other equipment, objects, individuals, etc. These are generally rigid, and have an upper mounting surface supported by or about at least one side or sidewall that extends downward from the upper mounting surface, for example, to the floor. An apple box can comprise wooden (or other material type) boxes or crates. For example, and for purposes of the discussion herein, apple boxes can be used to temporarily support furniture, light fixtures, light stands, camera equipment, leveling equipment, camera dolly track, etc. These can also be used to provide temporary seats, stands, workbenches, stepladders, etc. Other uses that may not be mentioned here are further contemplated. Apple boxes can come in a variety of sizes depending upon the particular need or intended use. Moreover, different sized apple boxes comprise unique names based on the height of the apple box. Most commonly, apple boxes comprise a "full apple" or just "apple box," a "half apple," which is half of the height of a full apple box, a "quarter apple," which is one quarter the height of a full apple box, and an "eighth apple," otherwise known as a "pancake," which is typically half of the height of a quarter apple box. Apple box sizes can vary, but typically all sizes are designed to be fractions of the full apple box size. Thus, two half apple boxes equal the size of a full apple box, two quarter apple boxes equals one half apple box, and two pancakes equal one quarter apple box. It is noted that other types of equipment mount support bases other than apple boxes may be utilized with the present technology and are contemplated herein, and as such, any reference to an apple box is not intended to be limiting in any way, as will be recognized by those skilled in the art.

Originally designed for mounting baby fixtures or junior fixtures (or other equipment) to floors, walls, etc., pin plates are a type of fixture mount that can also be used to assemble and provide low-to-the-ground stands for such fixtures (or other equipment). Prior or existing techniques accomplish this by attaching or affixing (e.g., securing with nails, screws, or other fasteners) the pin plate to an equipment mount support base, such as an apple box (e.g., a pancake type of apple box). The combination of a pin plate (or other structure providing a mounting terminus and a coupling interface in combination with a plate-type device as discussed herein) as attached to the upper mounting surface of an equipment mount support base (e.g., an apple box) can be referred to as a "skid plate," the pin plate comprising the mounting hardware for facilitating the mounting or removable coupling of fixtures or other equipment to the equipment mount support base, or apple box.

For purposes of simplifying the discussion, the term "pin plate" will be used below when describing a base plate-type of device in combination with a pin, receiver or other structure configured to provide a mounting terminus and a coupling interface, which is configured for use with an equipment mount support base, such as an apple box, to provide a skid plate. However, as mentioned above, it is to be understood that reference to a pin plate is not intended to be limiting in any way. Indeed, a pin plate can comprise a baby plate, a junior plate or a cheater plate (with a male-type (e.g., baby or junior pin) or female type (e.g., baby or junior receiver)interface) or can even generically include other similar types of combination pin/receiver and plates or plate-like devices that may or may not be described herein, but that have similar functions, and that can be employed and used in a similar manner, as will be recognized by those skilled in the art. Likewise, the term "apple box" will be used below for discussion purposes even though this is only an example subset of the generic mount support base in support of a pin plate to form a skid plate.

Pin plates (comprising baby/junior pins, baby/junior receivers, and others as discussed above) can be fastened (e.g., screwed, nailed, etc.) to various versions or types of apple boxes, which can then be used for a variety of purposes as discussed above. In doing so, the most common apple box size used is the eighth apple or pancake. For example, a baby plate can be mounted to a pancake to allow the subsequent mounting of some sort of fixture or other equipment (lighting fixtures and special effects-type equipment being most common) fitted with a receiver having a mounting terminus with a female coupling interface (e.g., a female-type receiver) designed to mate with the pin of the baby plate having a shaft and mounting terminus defining a male coupling interface (e.g., a male-type baby pin) extending from the base plate of the baby plate.

Turning now to the present technology, an initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The detailed description sets forth a skid plate for mounting and supporting motion picture production and other similar equipment, the skid plate comprising a mount support base, such as an apple box; a fixture mount, such as a pin plate, comprising a base plate defining a perimeter edge, and a mounting terminus supported about the base plate, the mounting terminus having a coupling interface; and a retention system operable to releasably secure the fixture mount (pin plate) to the mount support base (apple box). The retention system comprises a first rail mounted to the apple box at a first position and orientation; a second rail mounted to the apple box at a second position and orientation, and opposite the first rail; first and second capture channels defined at least in part by the first and second rails, wherein the pin plate is removably inserted into and captured by the first and second capture channels to secure the pint plate to the apple box.

Also set forth herein is an equipment mounting assembly for mounting and supporting motion picture production and other similar equipment, the equipment mounting assembly, comprising a fixture mount comprising a mounting terminus defining a coupling interface; a mount support base having an upper surface; and a retention system operable to selectively and releasably secure the fixture mount about the mount support base.

Also set forth herein is an equipment mounting assembly for supporting a production fixture, the equipment mounting assembly comprising a mount support base; and a fixture mount releasably coupled to the mount support base, wherein the fixture mount comprises a mounting terminus defining a capture interface operable to releasably couple a production fixture, the fixture mount and the mounting terminus being movable about the mount support base with the fixture mount secured to the mount support base.

To further describe the present technology, examples are now provided with reference to the figures. With reference to FIG. 1, illustrated is an equipment mounting assembly 10 in accordance with an example of the present disclosure. The exemplary equipment mounting assembly 10 can support a variety of motion picture production or photography fixtures or other similar equipment (referred to generally herein as production fixture(s) and collectively herein as production equipment). For example, these can be cameras, lights or lighting fixtures, etc. In the example shown, the equipment mounting assembly 10 is supportive of a light fixture 2 having a yoke 4 and a mounting terminus 6 coupled to the yoke 4, the mounting terminus 6 defining or comprising a female-type coupling interface. More specifically, the light fixture 2 comprises a baby fixture or baby light, and the mounting terminus 6 supported about the yoke 4 comprises a receiver (specifically, a baby receiver). Although FIG. 1 illustrates the equipment mounting assembly 10 as supporting a specific production fixture (a baby light), those skilled in the art will recognize that the equipment mounting assembly can support myriad types of production fixtures and production equipment, and as such, the specific type of production fixture shown is not intended to be limiting in any way.

Generally, the equipment mounting assembly 10 can comprise a mount support base 14, a fixture mount 44, and a retention system 70 configured to releasably couple and secure the fixture mount 44 to the mount support base 70 in a quick and efficient manner without the use of traditional fasteners and associated fastening means/methods. Stated differently, the equipment mounting assembly 10 can comprise a fastenerless mounting of the fixture mount 44 to the mount support base 14. By fastenerless, it is meant that no fasteners are used to temporarily secure and mount the fixture mount 44 to the mount support base 14, even though the equipment mounting assembly 10 may utilize one or more fasteners to secure various components of the retention system 70 to the mount support base in a more permanent manner.

The mount support base 14 can comprise any suitable base support structure or member capable of supporting various types of production equipment, such as about the floor or other ground surface, via the fixture mount 44 configured to be operable with the mount support base 14. Examples of mount support bases include, but are not limited to, apple boxes, crates, containers, chests, frames, planks, boards, beams, and any other type of suitable structure or structural elements. In one aspect, the mount support base 14 can be portable and able to be manipulated and carried by one or more individuals, but this size constraint is not intended to be limiting in any way as, indeed, other sized mount support bases are contemplated. The mount support base 14 can comprise a solid, semi-solid or frame-like structure, and can have any desired height.

The fixture mount 44 can comprise any suitable mounting structure having a mounting terminus (not shown) defining a coupling interface (not shown), the fixture mount 44 being operable to couple a production fixture (e.g., the light fixture 2) having a corresponding mounting terminus and coupling interface to facilitate support of the production fixture about the mount support base 14 of the equipment mounting assembly 10. Examples of fixture mounts include, but are not limited to, pin-type devices (e.g., a baby pin, a junior pin, a cheater pin, etc.), receiver-type devices (e.g., a baby receiver, a junior receiver, a cheater receiver, etc.). These pin-type or receiver-type of fixture mounts can further be supported by and extend from a base plate, wherein the resulting fixture mount can be referred to as a pin-plate or receiver-plate, these being also referred to sometimes as a nail-on plate. The pin-type device or receiver-type device can be permanently joined to the base plate (e.g., via welding, etc.), or removably or releasably joined to the base plate (e.g., via a threaded interface between the two components, etc.). The base plate can comprise any configuration and/or size. For example, the base plate can be rounded, rectangular, rounded rectangular, oval, square, etc. Moreover, existing pin-plates, receiver-plates and nail-on plates may be used with the present technology, however, these typically comprise various through holes formed in their base plates for the purpose of receiving fasteners, such as nails, to be used to mount them to a mount support base, such as an apple box. Therefore, it is noted that although these existing types of fixture mounts may be used, other uniquely designed pin plates/receiver plates devoid of any holes for fasteners may also be developed and used as the present technology advantageously eliminates the requirement for fasteners, as is discussed more fully below.

It is noted that other types of fixture mount structures or devices providing a mounting terminus and associated coupling interface for mounting production fixtures and equipment are contemplated herein, and as such, any reference to a baby pin, a baby receiver, a junior pin or a junior receiver, a pin plate, a receiver plate, a nail-on plate or other specific types herein is not intended to be limiting in any way, as will be recognized by those skilled in the art.

The equipment mounting assembly 10 can further comprise a retention system 70 operable to releasably capture, mount and secure the fixture mount 44 to the mount support base 14, namely without the use of fasteners, such as nails, screws, etc. Rather, the retention system 70 provides a quick connect/disconnect system that facilitates coupling and releasing or uncoupling/disconnecting of the fixture mount 44 to the mount support base 14 in a quick and efficient manner using uniquely designed coupling and retention components and systems that are integrally formed with the mount support base 14 and/or the fixture mount 44. In some aspects, the retention system 70 can be configured, such that the fixture mount 44, once captured and secured by the retention system 70, is movable about the mount support base 14 (i.e., movable even as captured due to the elimination of fasteners as are traditionally used to secure a fixture mount to a mount support base) to facilitate positioning and repositioning of the fixture mount 44 relative to the mount support base 14, all while the fixture mount 44 remains secured by the retention system 70. In other words, in some aspects, the fixture mount 44 is not required to be decoupled or disassembled or otherwise removed or separated from the mount support base 14 in order to locate it in a different position relative to the mount support base 14 after it is captured and secured by the retention system 70. This can also mean that the fixture mount 44 is movable at least to some degree relative to the mount support base 14, such as to facilitate insertion or removal of the fixture mount 44 into the retention system 70 (e.g., sliding the fixture mount 44 to a certain position within the recess, and then rotating the fixture mount 44 about one or more axes (e.g., a longitudinal axis, a lateral axis, or both) to cause one or more edges of the fixture mount 44 to clear one or more retaining rails to enable the fixture mount to be removed from the retention system 70). The retention system 70, including various example configurations and iterations, is discussed in greater detail below.

It is contemplated that one common or prevalent use of the present technology will involve a mount support base 14 in the form of an apple box (e.g., an eighth apple, or pancake), and a fixture mount 44 in the form of a pin or receiver plate (e.g., a baby plate or baby receiver), the two forming a skid plate upon the pin or receiver plate being coupled or otherwise secured to the apple box. The term "skid plate" is generally used to refer to an apple box and a pin-plate combination. However, unlike prior skid plates, the term "skid plate," as used herein, is intended to refer to an apple box and pin or receiver plate combination, that further comprises a retention system 70, such as one of the retention systems discussed and taught herein. As such, a skid plate can refer to a subset and specific type of equipment mounting assembly 10. In the specific example illustrated in FIG. 1, the light fixture 2 is shown as being supported in a functional, upright position by the skid plate, the skid plate comprising an eighth apple or pancake type of apple box, and a baby plate type of pin plate releasably captured and secured to the apple box via the retention system 70, the baby plate comprising a base plate and a baby pin having a mounting terminus (not shown) with a male-type coupling interface configured to be received into the mounting terminus 6 of the light fixture, which is in the form of a baby receiver having a female-type coupling interface. The light fixture 2 is releasably coupled to the skid plate by coupling together the baby receiver and the baby pin, and tightening the thumb screw 8 on the light fixture 2 to secure the coupling of the baby receiver and the baby pin of the baby plate.

As can be seen, and unlike prior related skid plates, no fasteners are used or needed to releasably couple the fixture mount 44 (e.g., the baby plate) to the mount support base 14 (e.g., the pancake type of apple box). As such, the present equipment mounting assembly 10 employing a retention system 70 provides several significant advantages over prior skid plate setups. For example, the equipment mounting assembly 10 facilitates quick and efficient skid plate construction or setup, and more specifically, quick and efficient capturing and securing, as well as disengaging and releasing, of the fixture mount 44 to/from the mount support base 14. Using the retention system 70, this can be done in a matter of only a few seconds (e.g., 1-3 seconds). Prior skid plates require much greater amounts of time to be constructed or setup. Depending upon their skill level and the specific mounting means and/or method being used, it is not uncommon for operators to need between 20 and 120 seconds, or more, to fasten a fixture mount (e.g., baby plate) to a mount support base (e.g., an apple box) using fasteners. As such, the present technology can provide as significant improvement in skid plate construction or setup rates over prior skid plate construction or setup rates. Another advantage is that the need for tools (e.g., screw guns, hammers, etc.) to setup a skid plate is eliminated as all fasteners are eliminated. An attendant advantage is that by eliminating fasteners, the frequent possibility of breaking screw heads off while mounting or dismounting the fixture mount is eliminated. Another advantage is that operator skills centered around using fasteners and the tools required to drive the fasteners are no longer a factor, again, due to the fact that fasteners are eliminated. Still another advantage is that the fixture mount can be disengaged and released from the mount support base without detaching the production fixture. In those examples where the retention system facilitates moving or positioning and repositioning of the fixture mount relative to the mount support base with the fixture mount captured and secured within the retention system, an additional advantage is that this can be accomplished without disengaging the fixture mount from the mount support base. It should also be noted that even with the retention system, in most cases, depending upon the particular configuration of the equipment mounting assembly, the mount support base can be used in its myriad other ways other than as a support for production equipment (e.g., as a stand for actors, etc.). In other words, the many uses of particular mount support bases other than as a support for production equipment can be preserved. That is, the retention system does not interfere with or preclude the use of the mount support base for any traditional purpose. In a similar fashion, existing fixture mount designs are not required to be altered or modified (even though in some cases they can be, if desired), thus permitting use of the countless number of existing fixture mounts with particularly designed equipment mounting assemblies, such as those taught herein. Stated differently, an equipment mounting assembly of the present technology can comprise a design and configuration for use with existing fixture mounts, such as the many existing baby or junior plates, etc. Other advantages will be apparent from the description of the various examples set forth below. Moreover, although several advantages are recognized herein, these are not intended to be limiting as those skilled in the art will be able to identify other possible advantages.

As noted above, the discussion of FIG. 1 is intended to introduce in a general manner the present technology. As such, it is further noted that one or more of the above-described elements, features, advantages, etc. discussed with respect to FIG. 1 can be applicable to and can be found in one or more of the various example equipment mounting assemblies discussed below, as will be recognized by those skilled in the art.

Figure 2A:
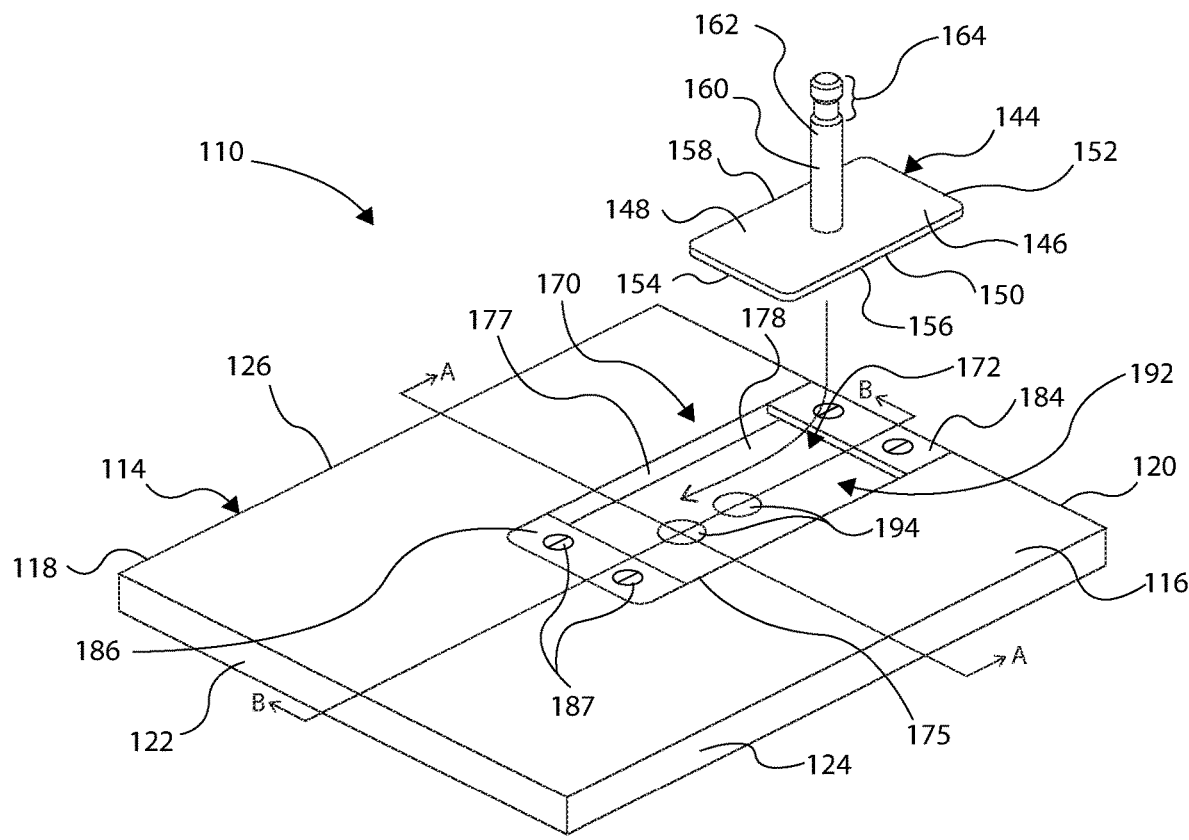
FIG. 2A illustrates an isometric view of an equipment mounting assembly in accordance with an example of the present disclosure.
Figure 2B:
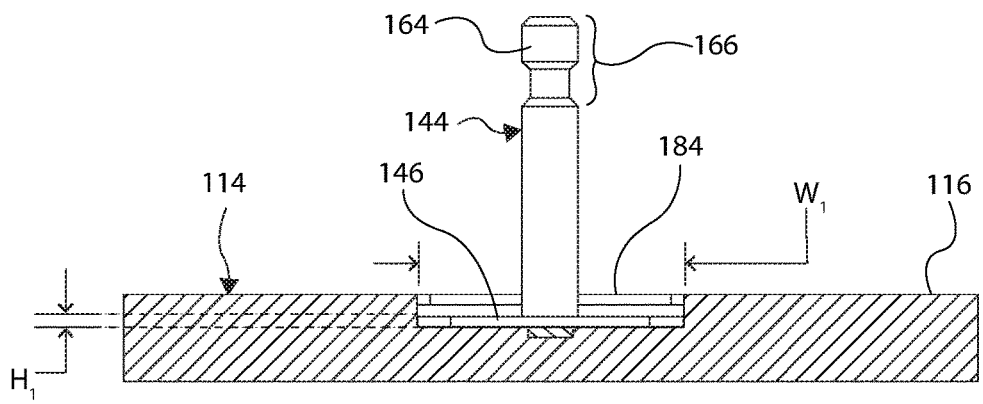
FIG. 2B illustrates a cross-sectional front view of the equipment mounting assembly of FIG. 2A (with the fixture mount shown in full), taken along section A-A, with the fixture mount captured by the retention system and secured to the mount support base.
Figure 2C:
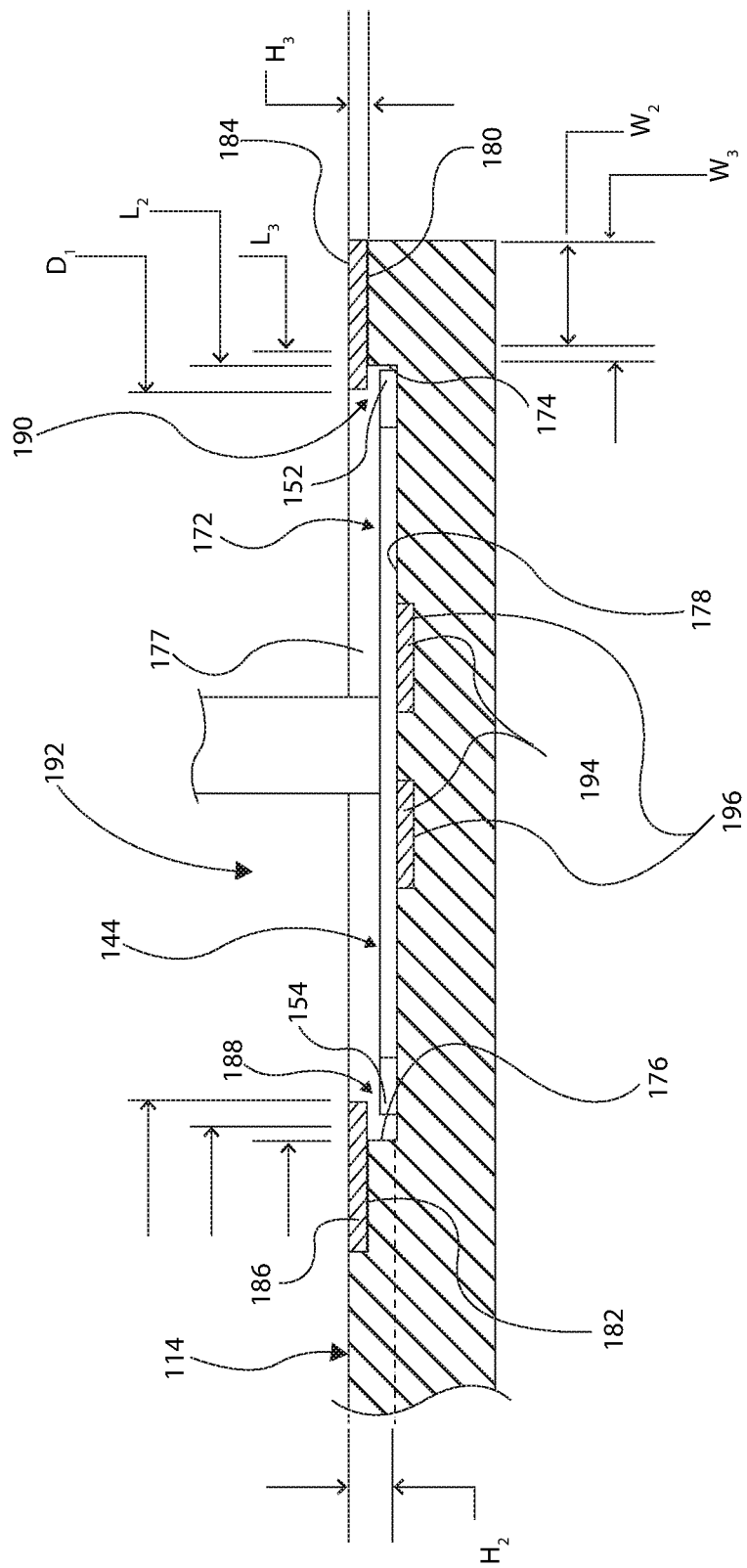
FIG. 2C illustrates a partial cross-sectional side view of the equipment mounting assembly of FIG. 2A (with the fixture mount shown in full), taken along section B-B, with the fixture mount captured by the retention system and secured to the mount support base.

Several different configurations of equipment mounting assemblies are contemplated herein, some of which are set forth below, which are provided merely as examples. These are not to be construed as limiting in any way. For purposes of discussion, the various examples illustrate a fixture mount in the form of a pin plate (such as a baby plate), and a mount support base in the form of an apple box (specifically an eighth apple or pancake), these being operable to provide a retention system. With reference to FIGS. 2A-2C, illustrated is an equipment mounting assembly 110 in accordance with an example of the present disclosure. The equipment mounting assembly 110 can comprise a mount support base 114 having an upper surface 116 and a perimeter or perimeter edge 118 defining any type of shape or configuration. In the example shown, the mount support base 114 can comprise a perimeter having a rectangular shape defining a first end 120, a second end 122, and first and second sides 124, 126. As will be apparent to those skilled in the art, other types of mount support bases, such as those having different sizes, shapes and/or configurations, are contemplated for use with the present technology, as discussed above.

The equipment mounting assembly 110 can further comprise a fixture mount 144 operable to be releasably secured to the mount support base 114. In one aspect, the fixture mount 144 can be in the form of a pin plate, such as a baby plate, as is known, or any other type of pin plate. The fixture mount 144 can comprise a plate portion or base plate 146 having an upper surface 148 and a perimeter 150 defining any type of shape or configuration, such as rounded rectangular, as shown. The base plate 146 can comprise first and second ends 152,154, and first and second sides 156, 158. Extending upward from the upper surface 148 of the base plate 146, the fixture mount 144 can further comprise a pin 160 having a shaft 162. The pin 160 can comprise a mounting terminus 164 formed about a distal end of the shaft 162, the distal end comprising that end of the pin 160 that terminates in space (the end of the pin not secured to the base plate 146, but located furthest from the base plate 146). The mounting terminus 164 can define a coupling interface operable to engage and releasably couple a production fixture (not shown, but see production fixture of FIG. 1 in the form of a light fixture). In the example shown, the fixture mount 144 comprises a mounting terminus 164 having a male-type coupling interface configured to engage and releasably couple a receiver of the production fixture having a female-type coupling interface. The fixture mount 144 can be made of any material suitable for supporting production equipment, and for being secured to the mount support base 114, such as metal, carbon fiber, and others. As will be apparent to those skilled in the art, other types of fixture mounts are contemplated for use with the present technology, as discussed above.

The equipment mounting assembly 110 can further comprise a retention system 170 operable to releasably secure the fixture mount 144, and any production fixture coupled thereto, to the mount support base 114 for the purpose of providing a support, stand, platform, etc. for the production fixture. As discussed above with respect to FIG. 1, the retention system 170 can be configured to accomplish this without requiring the use of fasteners, such as screws or nails. For example, as shown, the retention system 170 can comprise a recess 172 formed in the upper surface 116 of the mount support base 114. The recess 172 can comprise a recessed surface 178 located at a recess depth $D_2$ at least as deep as a thickness $D_1$ of the base plate 146 of the fixture mount 144, such that the upper surface 148 of the base plate 146 of the fixture mount 144 is flush or below the upper surface 116 of the mount support base 114 upon the fixture mount 144 being received and seated within the recess 172. The recess 172 can be sized and configured to receive the fixture mount 144 therein, and specifically the base plate 146 of the fixture mount 144. For example, as shown, the recess 172 can comprise an elongated, rectangular configuration having or defining a first end 174 opposite a second end 176, and a first side 175 opposite a second side 177, these being sized and configured so as to define a recessed area sufficiently sized to receive therein the base plate 146 of the fixture mount 144, wherein the fixture mount 144 is caused or permitted to be seated about the recess surface 178. The recess 172 can be formed at any location within the mount support base 114. For example, as shown, the recess 172 can be located adjacent the first end 120 of the mount support base 114, with the recess 172 initiating at or near the first end 120 and extending away from the first end 120 towards the second end 122, terminating at a point or location, such that the recess 172 comprises a length less than the length of the mount support base 114. The recess 172 can be sized with a width $W_1$ that is wider than the width $W_2$ of the base plate 146 of the fixture mount 144, thus permitting the fixture mount 144 to fit laterally between the sidewalls of the recess 172 without binding. Likewise, the recess 172 can comprise a length $L_3$ greater than the length $L_2$ of the base plate 146 of the fixture mount 144, thus permitting the fixture mount 144 to fit lengthwise between the first and second ends 174,176 of the recess 172.

The retention system 170 can further comprise first and second rails 184, 186 coupled or otherwise joined to the mount support base 114 in a position and orientation about the recess 172 so as to at least partially define and form first and second capture channels 188,190 within the recess 172, as well as, at least partially, an access opening 192 in communication with the first and second capture channels 188, 190. For example, as shown, the first rail 184 can be mounted to the mount support base 114 along the width of the recess 172 about the first end 174, and the second rail 186 can be mounted to the mount support base 114 opposite the first rail 184, and about the second end 176, each of these being oriented to extend in a lateral direction relative to the recess 172 (e.g., parallel to the first and second ends 120, 122 of the mount support base 114). Those skilled in the art will recognize that the rails 184, 186 could alternatively be mounted along the length of the recess 172, parallel to the sides 175, 177 of the recess. In this case, the recess 172 could be configured to extend beyond the rails a sufficient distance to permit the access opening to receive the fixture mount 144 (e.g., see FIG. 3A).

In one aspect, the first and second rails 184, 186 can be mounted to the upper surface 116 of the mount support base 114. In another aspect, mount support base 114 can further comprise first and second shoulders 180, 182 formed in its upper surface 116 adjacent the recess 172, these being sized and configured to receive at least a portion of the first and second rails 184, 186, respectively, wherein the first and second rails 184, 186 are mounted to the mount support base 114 about the respective first and second shoulders 180, 182. More specifically, the first and second shoulders 180, 182 can intersect the walls of the recess 172 defining the first and second ends 176, 174 of the recess 172. In addition, the first and second shoulders 180, 182 can comprise a width $W_2$ that is less than a width $W_3$ of the first and second rails 184, 186, thus facilitating the proper positioning of the rails 184,186 relative to the recess 172. In either case, the first and second rails 184,186 can be mounted to the mount support base 114, such that a portion of each of the first and second rails extends beyond an edge of the recess 172, or in other words, such that a respective side of each of the first and second rails 184, 186 overhangs an edge of and extends into the recess 172, the extended portion of the first and second rails 184, 186 and at least one surface of the recess (e.g., a wall, the recess surface, both of these, etc.) defining the first and second capture channels 188, 190, respectively. First and second rails 184,186 can be spaced apart from one another a distance $D_{rail1,rail2}$ that defines a distance that is less than a length $L_{FM}$ of the base plate 146 of the fixture mount 144, such that the fixture mount 144 cannot be removed from the capture channels 188,190 simply by lifting up on the fixture mount 144 (e.g., along a normal axis relative to the upper surface 116 of the mount support base 114). Furthermore, the rails 184,186 can be mounted in an elevated position relative to the recess surface 178, and can comprise a thickness or height $H_{rails}$, wherein the depth $H_{recess}$ of the recess 172 minus the thickness or height $H_{rails}$ of the rails 184, 186 (i.e., $H_{recess} - H_{rails} = H_{capture\ channels}$) can be coordinated, such that the first and capture channels 188, 190 are sufficiently sized to receive and capture a portion of the base plate 146 of the fixture mount 144. For example, in one aspect, the capture channels 188, 190 can be formed to comprise a height $H_{capture\ channels}$ just slightly greater than the thickness or height $H_{base\ plate}$ of the base plate 146 of the fixture mount 144. In another aspect, the capture channels 188, 190 can be formed to comprise a height $H_{capture\ channels}$ between 1 and 2 times the thickness or height $H_{base\ plate}$ of the base plate 146 of the fixture mount 144. In still other aspects, this height can be even greater than twice $H_{base\ plate}$. Of course, these are only example relative sizes, and as such, are not to be limiting in any way. Based on the foregoing, a gap distance $D_{gap}$ between the upper surface 148 of the base plate 146 of the fixture mount 144 and the bottom surface of the rails 184, 186 can be calculated in accordance with the following: the height of the first and second capture channels 188, 190 $H_{capture\ channels}$ minus the height or thickness of the base plate 16 of the fixture mount 144 (i.e., $H_{capture\ channels} - H_{base\ plate} = D_{gap}$). The gap distance can define the amount of travel or play that exists between the fixture mount 144 and the first and second rails 184, 186 along an axis normal to the recess surface 178.

The rails 184, 186 can be coupled or otherwise mounted or joined to the mount support base 114 using permanent or non-permanent types of fasteners (e.g., nails, screws, nuts/bolts, welds, etc.), adhesives and any other joining means known by those skilled in the art. The type of joining means used can depend on the type of material making up the mount support base and the rails, or other factors. In the example shown, the rails 184, 186 are mounted using screws 187 inserted through apertures (not shown) formed in the rails 184, 186 and driven into the mount support base 114, which can be made of wood.

In an alternative example, and as will be apparent to those skilled in the art, the rails can be formed from the material making up the mount support base 114. For example, in the case of a mount support base comprising an apple box made of wood, the recess and the rails can be formed by removing the necessary material (e.g., by routing) to form these within the wood structure of the apple box. As such, it is contemplated that some equipment mounting assemblies can comprise rails that are integrally formed into the mount support base without requiring additional hardware elements.

As discussed herein, the retention system 170 can be configured to support a production fixture. That being said, the equipment mounting assembly 110 can be configured to withstand the various forces and moments that may result from coupling a production fixture to the equipment mounting assembly 110. In one aspect, the equipment mounting assembly 110 can be configured to at least support the same type of production equipment that a similar, prior related skid plate could support, the skid plate comprising a fixture mount joined to an apple box using screws or other fasteners. In another aspect, the equipment mounting assembly 110 can be configured to support different types of production equipment that may not have been able to be supported prior to the present technology. For instance, some production equipment may be sufficiently heavy, such that coupling to a prior existing skid plate could, under some circumstances, potentially cause the fasteners to rip from the apple box, thus destroying the apple box, and potentially destroying or damaging the attached production fixture, as well as potentially injuring operators or other individuals in close proximity. Those skilled in the art will recognize the different design parameters in the equipment mounting assembly 110 that can be varied to accommodate different production equipment support scenarios.

The retention system 170 can further comprise a position keep system operable to assist in controlling and maintaining a position of the fixture mount 144, and to further secure the fixture mount 144, once captured by and secured within the retention system 170. The position keep system can employ a variety of devices, systems, mechanisms, etc. for accomplishing this. Various examples are discussed herein, and shown in the drawings. In one example, the position keep system can comprise a biasing system operable to provide a sufficient biasing force (a normal force) between the fixture mount 144 and the mount support base 114, such that movement between the fixture mount 144 (as captured within the retention system 170) and the mount support base 114 is hindered or resisted, and therefore restricted to some degree or another. In one aspect, the minimum magnitude of the biasing force can be such that the fixture mount 144 is prevented from moving under its own weight (e.g., under the influence of gravity). In this case, the resistance or hindrance of the movement of the fixture mount 144 can be controlled by varying the magnitude of the biasing forces(s) generated by the position keep system. This can be accomplished through specific design of the various components of the equipment mounting assembly 110. Indeed, the position keep system can be configured, such that, once activated and the one or more biasing forces are applied, a pre-determined threshold friction force is required to be applied to the fixture mount 144 to overcome the biasing forces and a corresponding coefficient of static friction, and to cause it to move within the retention system 170. It is noted that this pre-determined threshold friction force can be applied directly, such as by an operator or an impact to the fixture mount 144, or indirectly, such as by momentum generated from abrupt movements of the equipment mounting assembly 110 (e.g., throwing the equipment mounting assembly 110, impacting the equipment mounting assembly 110 (e.g., dropping the equipment mounting assembly 110, etc.).

In one specific example, as shown, the position keep system can comprise a series of magnets 196 disposed in the recess 172 operable to apply a biasing force in the form of an attraction force on the fixture mount 144. As such, in this example, the positioning keep system can further comprise the base plate 146 of the fixture mount 144, particularly as it is made of metal and is capable of reacting to the applied magnetic biasing force. In one aspect, the magnets 196 can be disposed in respective magnet bays 196 formed in the recess surface 178, and secured therein with an adhesive or other bonding agent. The magnets 196 can be sized and configured to be seated within the magnet bays 196, such that an upper surface of the magnets 196 is flush with the recess surface 178, thereby maintaining a planar recess surface upon which the fixture mount 144 may be seated. Although two magnets 196 are shown, any number of magnets can be used to vary the biasing force and the corresponding friction forces, and these can comprise any size and configuration desired. In addition, the magnets 196 (and magnet bays 196) can be located at different positions within the recess 172. For example, the magnets can be located centrally within the recess 172 along a mid-line, as shown. Alternatively they may be located in different or other locations, such as within quadrants of the recess 172. In yet another alternative, they may be located about and supported within the walls of the recess. In any event, the magnets 196 are intended to interact with the fixture mount 144, and particularly one made of metal and having a magnetic attraction, such as a pin plate. This interaction comprises applying a biasing force in the form of an attraction force to the fixture mount 144 for the purpose of biasing, via a generated magnetic field, the fixture mount 144 against the mount support base 114, and in some cases also against one or more components of the retention system 170. In order to sufficiently interact with the fixture mount 144, the magnets 196 can be strategically configured, located and positioned, meaning that the magnetic force applied by the magnets 196 is suitable to act on the fixture mount 144. The magnets 196 can comprise or be comprised of any suitable material, as will be recognized by those skilled in the art. For example, the magnets can comprise those that provide their own magnetic field, such as those that are made with ferromagnetic or ferrimagnetic materials.

Figure 2D:
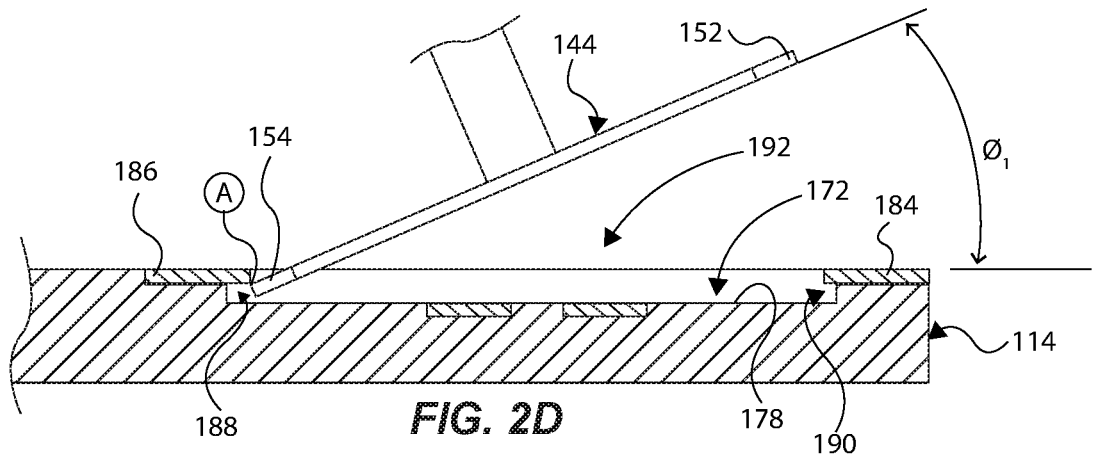
FIG. 2D illustrates a partial cross-sectional side view of the equipment mounting assembly of FIG. 2A (with the fixture mount shown in full), with the fixture mount in a first engagement position relative the mount support base.
Figure 2E:
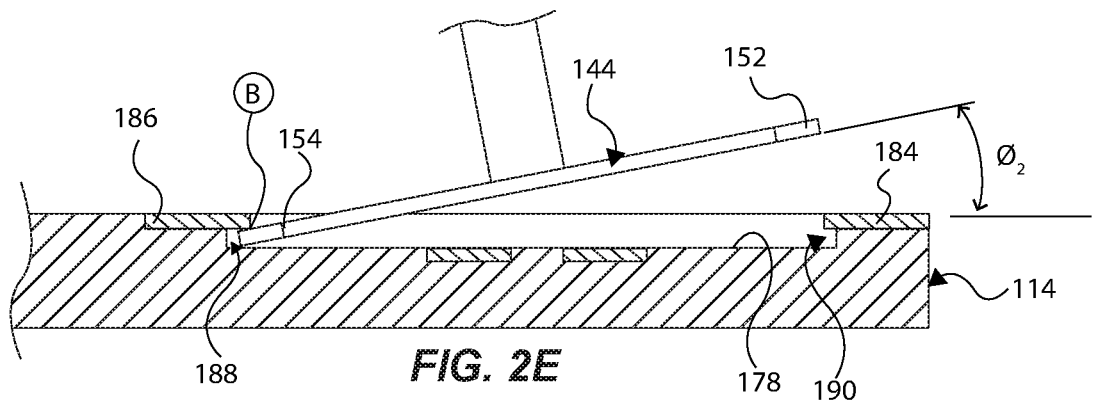
FIG. 2E illustrates a partial cross-sectional side view of the equipment mounting assembly of FIG. 2A (with the fixture mount shown in full), with the fixture mount in a second engagement position relative the mount support base.
Figure 2F:
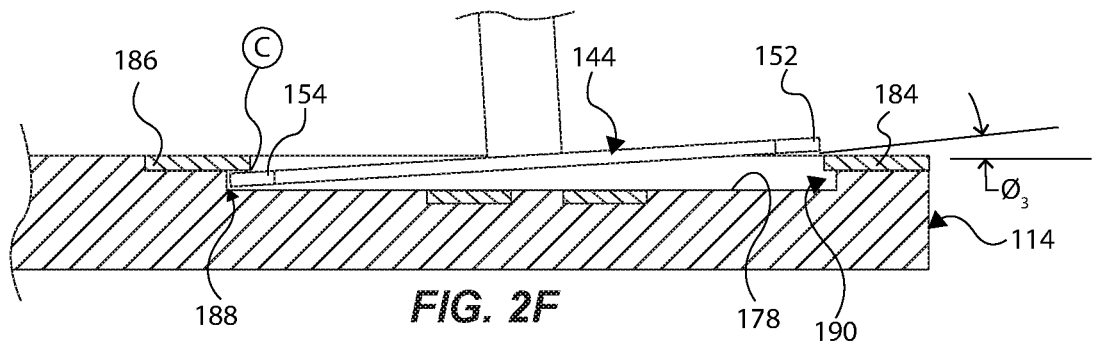
FIG. 2F illustrates a partial cross-sectional side view of the equipment mounting assembly of FIG. 2A (with the fixture mount shown in full), with the fixture mount in a third engagement position relative the mount support base.
Figure 2G:
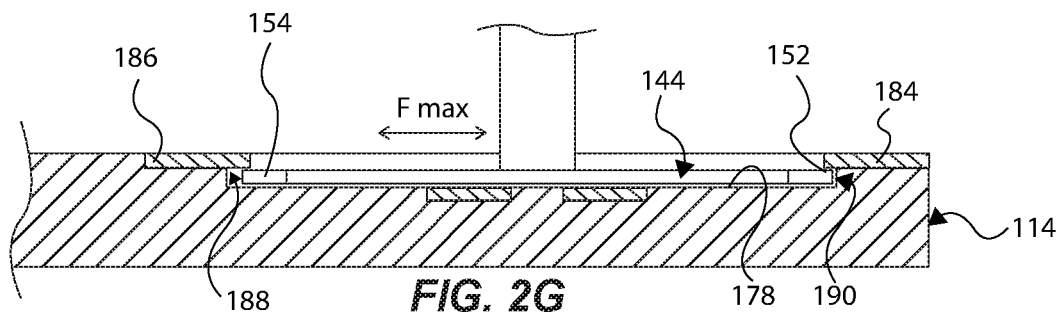
FIG. 2G illustrates a partial cross-sectional side view of the equipment mounting assembly of FIG. 2A (with the fixture mount shown in full), with the fixture mount in a fourth engagement position relative the mount support base.

In operation, the equipment mounting assembly 110 can be assembled and put into use to support production equipment by securing the fixture mount 144 to the mount support base 114 via the retention system 170 (and then coupling a production fixture (not shown, but see FIG. 1) to the fixture mount 144). With the example equipment mounting assembly 110 shown, this can be accomplished by inserting the fixture mount 144 through the access opening 192, and causing the base plate 146, and particularly different portions of the base plate 146 (e.g., different edge portions) to be captured by the rails 184,186 and secured within the capture channels 188,190, the access opening 192 being in communication with the capture channels 188, 190. In the present case, because the access opening 192 is sized to be smaller than the base plate 146 in order to be able to secure the fixture mount 144 in the retention system 170 without it inadvertently releasing, the fixture mount 144 can be obtained and rotated about a lateral axis so that it is oriented on an incline relative to the mount support base 114 (referred to herein as an access angle $\theta_1$) just prior to being inserted through the access opening 192. With the fixture mount 144 oriented on an access angle $\theta_1$, the second end 154, for example, of the base plate 146 can be inserted initially through the access opening 192 until coming in contact with the recess surface 178, the second end 154 subsequently being inserted into the capture channel 188, for example, as far as possible until the upper surface 148 of the base plate 146 comes in contact with the second rail 186 at point A (see FIG. 2D, point A). Once in this position, the fixture mount 144 can be rotated downward toward the mount support base 114, thereby decreasing the access angle to a new access angle $\theta_2$, wherein the second end 154 of the base plate 146 is able to be inserted further into the capture channel 188 causing the second rail 186 to slide along the upper surface 148 of the base plate 146 until contact of the second rail 186 with the upper surface 148 reaches point B (see FIG. 2E, point B), thus limiting any further progression. In this position, the fixture mount 144 can be again rotated downward toward the mount support base 114, thereby further decreasing the access angle to a new access angle $\theta_3$, wherein the second end 154 of the base plate 146 is able to be inserted even further into the capture channel 188, again causing the second rail 186 to slide along the upper surface 148 of the base plate 146 until contact of the second rail 186 with the upper surface 148 reaches point C (see FIG. 2F, point C), which is just prior to when the first end 152 is able to clear the first rail 184. As can be seen, as the fixture mount 144 is rotated, it travels along an arcuate path. In addition, as the access angle $\theta$ is reduced and the second end 154 caused to progress further into the capture channel 188, the first end 152 of the base plate 146 is brought toward the first rail 184. Further rotation of the fixture mount 144 and decrease of the access angle $\theta$ will permit the first end 152 to clear and move past the first rail 184, wherein the fixture mount 144 can subsequently be fully inserted into the recess 172 and caused to be seated about the recess surface 178. Once in this position, the fixture mount 144 can then be slid along the recess surface 178 toward the first end 174 of the recess 172 a sufficient distance to insert the first end 152 of the base plate 146 into the capture channel 190, thereby capturing the first end 152 in the capture channel 190, and fully securing the fixture mount 144 to the mount support base 114. In doing so, the retention system 170 is configured so as to maintain the second end 154 of the base plate 146 of the fixture mount 144 within the capture channel 188. The capture channel 190 can be sized to be smaller than the capture channel 188. This can be accomplished by configuring the retention system 170, such that the overhang distance of the rail 184 is less than the overhang distance of the rail 186. Stated differently, the shoulder 180 supporting the rail 184 can be wider than the shoulder 182 supporting the rail 186, thereby decreasing the overhang of the rail 184 and making capture channel 190 smaller or less deep (in the translation direction (e.g., along an x-axis as viewed in FIGS. 2D-2G)) than the capture channel 188. With the retention system 170 thus configured, the fixture mount 144 is caused to be removable from only one direction, and only about its first end 152. In its secured position, the equipment mounting assembly 110 is setup or formed, and ready to receive and support a production fixture. It is noted that although the above-recited process is described in a stepwise manner, that this is not intended to be limiting, but merely to assist in the understanding of the process. In practice, it is likely that the above-recited process will be carried out in a single motion.

As the fixture plate 144 is being inserted, the position keep system, if present, in the form of a biasing system comprising the magnets 194 activates to exert a biasing force on the fixture mount 144 (a normal biasing force, or a force along a normal vector), and particularly the base plate 146, the biasing force acting to attract the fixture mount 144. Once the fixture mount 144 is fully seated against the recess surface 178, the position keep system is fully activated to apply its greatest magnitude of biasing force on the fixture mount 144. Therefore, in order to move the fixture mount in any direction once it is retained within the retention system 170, such as to cause the first end 152 of the base plate 146 to be captured within the capture channel 190 to fully secure the fixture mount 144, this biasing force, and the coefficient of static friction or surface forces $\mu_s$ that oppose relative motion, must be overcome. Generally speaking, static friction forces must be overcome by an applied force before an object can move. The maximum possible static friction force between two surfaces before movement begins is the product of the coefficient of static friction and the normal force $F_n$, namely, $F_{max}=\mu_s F_n$. When the objects are static with no relative movement between them, the friction force can have any value from zero up to $F_{max}$. Any friction force smaller than $F_{max}$ attempting to move or slide one surface over the other is opposed by a frictional force of equal magnitude and opposite in direction, wherein the objects remain static. Any force larger than $F_{max}$ functions to overcome the force of static friction, thus causing relative movement or sliding to occur. In this case, the normal force $F_n$ between the fixture mount 144 and the mount support base 114 comprises the biasing force, and will be higher than it otherwise would be due to the presence of the magnetic attraction forces (the biasing force) being applied to the fixture mount 144 by the position keep system. Therefore, the friction force $F_{max}$ needed to initiate movement of the fixture mount 144 will be higher than it otherwise would be without the position keep system. $F_{max}$ can depend upon a variety of factors, as will be apparent to those skilled in the art.

Along with assisting in maintaining a select, desired position of the fixture mount 144 relative to the mount support base 114, the position keep system can further function to comprise a sufficient $F_{max}$ to prevent the fixture mount 114 from inadvertent or unintended movement within the retention system 170. Stated differently, any potential play that may otherwise exist within the retention system 170 is not a factor and rendered ineffective. Indeed, even though the capture channels 188, 190 and the recess 172 provide limited gaps between them and the fixture mount 144, the position keep system functions to maintain the fixture mount 144 in a static state pressed against the mount support base 114 until movement (e.g., translation and rotation for removal purposes) is desired by the operator.

To release the fixture mount 144 from the mount support base 114, the above-recited steps for engagement can be reversed. As can be seen, the recess 172, and the associated capture channels 188, 190 are sized and configured to permit a calculated amount of bi-directional translational movement of the fixture mount 144 once it is fully seated about the recess surface 178.

With reference to FIGS. 3A-3B, illustrated is an equipment mounting assembly 210 in accordance with an example of the present disclosure. The equipment mounting assembly 210 is similar in many respects to the equipment mounting assembly 110 of FIGS. 1A-1G. As such, to avoid unnecessary repetition, it is intended that the above description of equipment mounting assembly 110 be referred to for an understanding and disclosure of like or similar elements and like or similar configurations and functions as pertaining to equipment mounting assembly 210. Those skilled in the art will recognize the like or similar elements and functions and can refer to the discussion of FIGS. 1A-1G for support of these. Therefore, the above-discussion of FIGS. 1A-1G is intended to provide support for much of the equipment mounting assembly 210, and any claims directed thereto. Any differences between equipment mounting assembly 110 and equipment mounting assembly 210 will be apparent from the discussion below.

The equipment mounting assembly 210 can comprise a mount support base 214, a fixture mount 244, and a retention system 270. However, as will be discussed below, unlike the equipment mounting assembly 110 of FIGS. 2A-2G, the equipment mounting assembly 210 shown in FIGS. 3A-3B facilitates selective positioning and repositioning of the fixture mount 244 about the mount support base 214 once the fixture mount 244 is captured within and secured by the retention system 170, thus facilitating support of a production fixture (not shown, but see FIG. 1) in a plurality of selectable support positions. The various support positions can be selected and modified as often as needed or desired without releasing and removing the fixture mount 244 from the mount support base 214, and without having to decouple the supported production fixture. This is discussed in greater detail below.

The mount support base 214 is similar to the mount support base 114 differing only in size (particularly the length). The mount support base 214 can comprise an upper surface 216 and a perimeter or perimeter edge 218 defining any type of shape or configuration. In the example shown, the mount support base 214 can comprise a perimeter having a rectangular shape defining a first end 220, a second end 222, and first and second sides 224, 226. Again, as will be apparent to those skilled in the art, other types of mount support bases, such as those having different sizes, shapes and/or configurations, are contemplated for use with the present technology, as discussed above.

The fixture mount 244, shown as the same type of pin plate as that in FIG. 2A, can comprise, as discussed herein, a base plate 246 having an upper surface 248 and a perimeter 250. The base plate 246 can comprise first and second ends 252, 254, and first and second sides 256, 258. Extending upward from the upper surface 248 of the base plate 246, the fixture mount 244 can further comprise a pin 260 having a shaft 262. The pin 260 can comprise a mounting terminus 264 formed about a distal end of the shaft 262, the mounting terminus 264 defining a coupling interface.

The retention system 270, as discussed herein, can comprise a recess 272 formed in the upper surface 216 of the mount support base 214. The recess 272 can comprise a recessed surface 278. The recess 272 can be sized and configured to receive the fixture mount 244 therein, and to facilitate or provide for the positioning of the fixture mount 244 at various support positions along the length of the recess 272. For example, as shown, the recess 272 can comprise an elongate, rectangular configuration having or defining a first end 274 opposite a second end 276, and a first side 275 opposite a second side 277, these being sized and configured so as to define a recessed area sufficiently sized to receive therein the base plate 246 of the fixture mount 244. The recess 272, as shown, can extend along most of the length of the mount support base 214, and can comprise a length that is at least as long as the base plate 246 of the fixture mount 244. For example, as shown, the end 274 of the recess 272 can be located adjacent the first end 220 of the mount support base 214, with the recess 272 initiating at or near the first end 220 and extending away from the first end 220 towards the second end 222 of the mount support base 214, terminating at a location that is adjacent the second end 222 of the mount support base 214, thus facilitating a wide array of available support positions depending upon the size (e.g., length) of the base plate 246 of the fixture mount 244 relative to the size (e.g., length) of the recess 272. In some aspects, the recess 272 and the base plate 246 can comprise corresponding sizes that facilitate a translation distance of the fixture mount 244 that is at least 0.25 times the size of the base plate 246 of the fixture mount 244 as measured in the translation direction once the fixture mount 244 is secured within the retention system 270. Nonetheless, this is not intended to be limiting in any way. Another way of looking at this is that the equipment mounting assembly 210 can be configured, such that the mounting terminus 264 of the fixture mount 244 is positionable in a plurality of positions within the retention system 270, no matter the configuration of the mount support base 214, the fixture mount 244, or the retention system 270, such as the elements of the recess 272 and the fixture mount 244. Essentially, it is intended that the plurality of support positions be related to the mounting terminus 264, as it is this structure that releasably couples to the production fixture, and ultimately it is the position of the production fixture that is of principal concern.

In the example shown, the fixture mount 244 is caused or permitted to be seated about the recess surface 278, and to slide in a bi-directional manner within the recess 272 once captured and secured by the retention system 270 between the first and second ends 274,276 of the recess 272. Based on the size of the base plate 246 of the fixture mount 244 along its length from the first end 252 to the second end 254 (the size measured along what will be the translation direction of the fixture mount 244), the fixture mount 244 can travel in a bi-directional manner within the recess 272 a distance that is about 2.5 times the length of the base plate 246 (the length of the recess 272 being about 3.5 times the length of the base plate 246).

The retention system 270 can further comprise first and second rails 284,286 coupled or otherwise joined to the mount support base 214 in a position and orientation about the recess 272 so as to at least partially define and form first and second capture channels 288,290 within the recess 272, as well as, at least partially, an access opening 292 in communication with the first and second capture channels 288,290. For example, as shown, the first rail 284 can be mounted to the mount support base 214 along the length of the recess 272, and specifically about a first side 275 of the recess, and the second rail 286 can be mounted to the mount support base 214 opposite the first rail 284 along the length of the recess 272, and about the second side 277 of the recess 272.

The first and second rails 284,286 can be mounted to the upper surface 216 of the mount support base 214. In another aspect, mount support base 214 can further comprise first and second shoulders 280,282 formed in its upper surface 216 adjacent the recess 272, these being sized and configured to receive at least a portion of the first and second rails 284,286, respectively, wherein the first and second rails 284,286 are mounted to the mount support base 214 about the respective first and second shoulders 280,282, these being configured and located as shown. The first and second rails 284,286 can be mounted to the mount support base 214, such that a portion of each of the first and second rails 284,286 extends beyond an edge of the recess 272, or in other words, such that a respective side of each of the first and second rails 284,286 overhangs an edge of and extends into the recess 272, the extended portion of the first and second rails 284,286 and at least one surface of the recess (e.g., a wall, the recess surface, both of these, etc.) defining the first and second capture channels 288,290, respectively, each sufficiently sized to receive and capture a portion of the base plate 146 of the fixture mount 144.

First and second rails 284,286 can each comprise respective first ends 298, 299 spaced apart from the first end 274 of the recess 272 a distance so as to define an access opening 292 into the recess 272. In one aspect, the first ends 298,299 of the rails 284,286 can be located a distance from the first end 274 of the recess 272 that measures the same as the length of the base plate 246 of the fixture mount 244, thus defining an access opening 292 that can receive the fixture mount 244 along a normal axis. In another aspect, the first ends 289,299 of the rails 284,286 can be located a distance from the first end 274 of the recess 272 that measures less than the length of the base plate 246 of the fixture mount 244, thus defining an access opening 292 that can receive the fixture mount 244 in a similar manner as described above with respect to the equipment mounting assembly 110 of FIGS. 2A-2G where the fixture mount 244 can be oriented on an access angle and progressively inserted into the recess 272 and the capture channels 288,290 to clear an edge of the recess 272 about the first end 274.

The retention system 270 can further comprise a third rail 287 mounted to the mount support base 214 along a width of the recess 272, and about the first end 274, the third rail 287 functioning to also secure a portion of the base plate 246 of the fixture mount 244 to assist in securing the fixture mount 244 to the mount support base 214, again without fasteners. The third rail 287 can be mounted to the mount support base 214 in a similar manner as the first and second rails 284,286 (e.g., within a shoulder), such that a portion (e.g., the side and corresponding edge) of the third rail 287 extends beyond the edge of the recess 272 about the first end 274 and into the recess 272, thus defining, in part, a third capture channel 291 extending along the first end 274 of the recess 272 and oriented orthogonal to the first and second capture channels 288,290, the first, second and third rails 284,286,287 defining the access opening, the access opening 292 being sized smaller than the base plate of the fixture mount 244, such that the fixture mount 244 cannot be directly received into the recess 272 through the access opening 292. In the example shown, the rails 284,286,287 are made of metal, and are mounted to the mount support base 214 using an adhesive. In this example, the rails 284,286, and particularly the first and second ends 298,299 of the rails 284,286, can be caused to function together in a similar manner as the second rail 186 of the equipment mounting assembly 110 shown in FIGS. 2A-2C, with the third rail 287 functioning in a similar manner as the first rail 184 of the equipment mounting assembly 110 of those figures. Indeed, the first and second ends 298,299 of the first and second rails 284,286 can be located a distance from the third rail 287 that measures less than the length of the base plate 246 of the fixture mount 244, thus defining an access opening 292 that can receive the fixture mount 244 in a similar manner as described above with respect to the equipment mounting assembly 110 of FIGS. 2A-2G. In a similar manner as discussed above with reference to those figures, the fixture mount 244 can be oriented on an access angle and progressively inserted into the recess 272 and the capture channels 288,290 until it is able to clear an edge of the third rail 287. Once the fixture mount 244 is inserted far enough into the recess 272 and the first and second capture channels 288,290 to clear the third rail 287, the fixture mount 244 can be fully seated within the recess 272 against the recess surface 278. Once seated, the fixture mount 244 can be moved in a direction towards the first end 274 to cause a portion of the base plate 246, namely a first end 252 of the base plate 246, to be inserted into and captured by the third capture channel 291 with other or different portions of the base plate 246, namely the second end 254 and the sides 256,258, captured by the first and second capture channels 288,290. The access opening 292 can be sized smaller than the base plate 246 of the fixture mount 244 in the lengthwise direction (the recess 272 being slightly larger along the width), such that the fixture mount 244, once secured within the retention system 270, cannot be removed from the capture channels 288,290,291 simply by lifting up on the fixture mount 244 (e.g., along a normal axis relative to the upper surface 216 of the mount support base 214). The first, second and third capture channels 288,290,291 are sufficiently sized to receive and capture different portions of the base plate 246 of the fixture mount 244, and to function in a similar manner as other capture channels discussed herein.

The retention system 270 can further comprise a position keep system. The position keep system can, as shown, comprise similar elements, be configured similar to, and can function similar to, the position keep system of equipment mounting assembly 110 described above, and shown in FIGS. 2A-2G. Here, the position keep system can comprise a plurality of magnets 294 seated within corresponding magnet bays 296. The magnets 294 can be located within the recess 272 along a central axis, as shown. The position keep system can comprise any number of magnets 294, and the magnets 294 can be spaced apart from one another, as needed or desired, for example, such that at least two of such magnets 294 are applying a biasing force to the base plate 246 of the fixture mount 244 at any given time as the fixture mount 244 is positioned and repositioned within the retention system 279. A more or less dense cluster of magnets can be used, as will be apparent to those skilled in the art.

In operation, once the fixture mount 244 is secured to the mount support base 214 within the retention system 270, the fixture mount 244 can be caused to move in a bi-directional manner and positioned in any one of an infinite number of positions relative to the mount support base 214, constrained in part by the configuration and size of the recess 272, such as the elongate rectangular recess shown having first and second ends 220,220 and first and second sides 275,277. Position A and position B represent two of such positions along the mount support base 214. The fixture mount 244 can be caused to maintain a selected position through application of the position keep system. The position of the fixture mount 244 can be changed by overcoming the friction force generated within the retention system 270, such as by pushing on a part of the fixture mount 244 with sufficient force.

FIGS. 4A-4B illustrate an alternative exemplary position keeping system as part of the retention system 270. In this example, the position keeping system comprises a plurality of elastic elements configured to apply a biasing force to the fixture mount 244 upon the fixture mount 244 being captured and secured to the mount support base 214 via the retention system 270. The elastic elements can comprise a pre-determined modulus of elasticity (i.e., the inherent elastic properties of a material as a resistance to deformation under an applied load). In one example, the elastic elements can comprise a plurality of elastomers (e.g., rubber) or elastomeric members 331,333,335. The plurality of elastomeric members 331,333,335 can be joined to the underside of the first, second and/or third rails 284,286,287, respectively, at strategic locations, such that they extend downward into the respective capture channels 288,290,291, thus being configured to apply a biasing force to the fixture mount 244. Indeed, the elastomeric members 331,333,335 can be sized and configured, such that they are compressed and elastically deformed to achieve a degree of elasticity upon the fixture mount 244 being captured and secured to the mount support base 214, wherein the biasing force is applied to the fixture mount 244 to facilitate maintenance of a selected position of the fixture mount 244 relative to the mount support base 214. In one aspect, the plurality of elastomeric members 331,333,335 can comprise elongate configurations that span substantially between the ends of the rails. In another aspect, the plurality of elastomeric members 331, 333,335 can comprise a series of individual members on each rail. The elastomeric members 331,333,335 can be joined to the rails using an adhesive. The retention system 270 can therefore comprise a resulting first coefficient of static friction $\mu_{s1}$ between the elastomeric members 331,333, 335 and the first, second and/or third rails 284,286,287, and a second coefficient of static friction $\mu_{s2}$ between the fixture mount 244 and the mount support base 214. In order to overcome the static friction and cause the fixture mount 244 to move or slide within the retention system 270, the $F_{max}$ of the retention system must be exceeded, $F_{max}$ being the product of the normal force acting on the fixture mount 244 and the greater of the first and second coefficients of static friction.

Figure 5A:
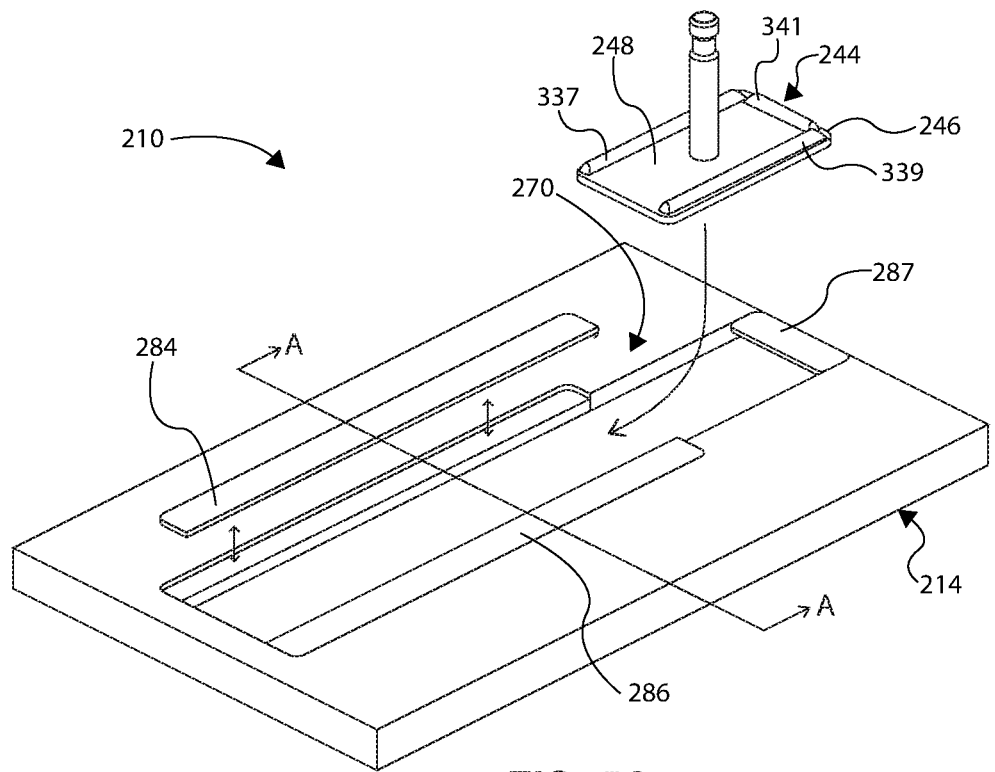
FIG. 5A illustrates an isometric view of the equipment mounting assembly of FIG. 3A comprising still another alternative position keep system in accordance with an example of the present disclosure.
Figure 5B:
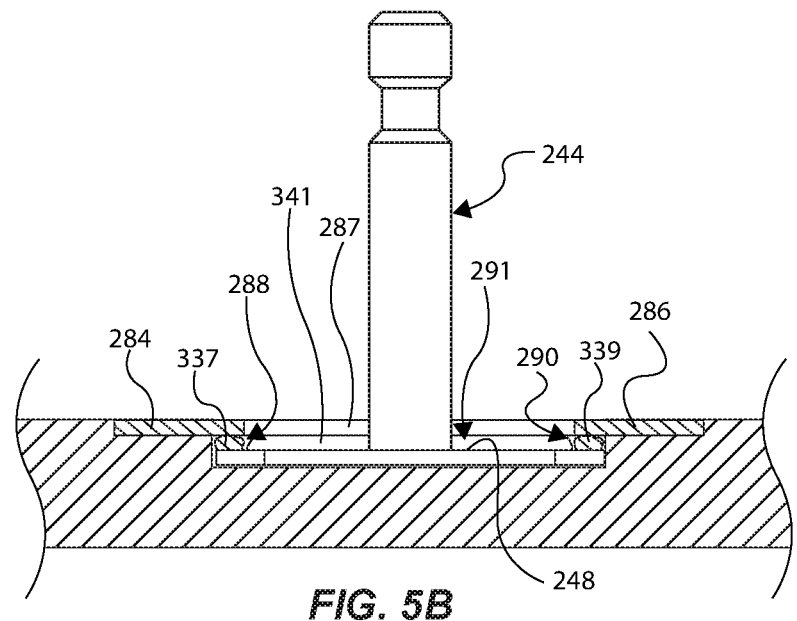
FIG. 5B illustrates a partial cross-sectional front view of the equipment mounting assembly of FIG. 5A (with the fixture mount shown in full), taken along section A-A.

FIGS. 5A and 5B illustrate an alternative exemplary position keeping system as part of the retention system 270. The position keeping system can comprise a plurality of elastic elements configured to apply a biasing force to the fixture mount 244 upon the fixture mount 244 being captured and secured to the mount support base 214 via the retention system 270, similar to those shown in FIGS. 4A and 4B. However, in this example, the elastic elements can comprise a plurality of elastomeric members 337,339,341 that can be joined to the upper surface 248 of the fixture mount 244, such as by using adhesives. The elastomeric members 337,339,341 can be located at strategic locations about the upper surface 248, such that they extend upward into the respective capture channels 288,290,291 to contact an underside of the rails 284,286,287, respectively, upon the fixture mount 244 being captured and secured within the retention system, wherein they are compressed and elastically deformed to apply the biasing force to the fixture mount 244, thereby facilitating maintenance of a selected position of the fixture mount 244 relative to the mount support base 214.

Figure 6A:
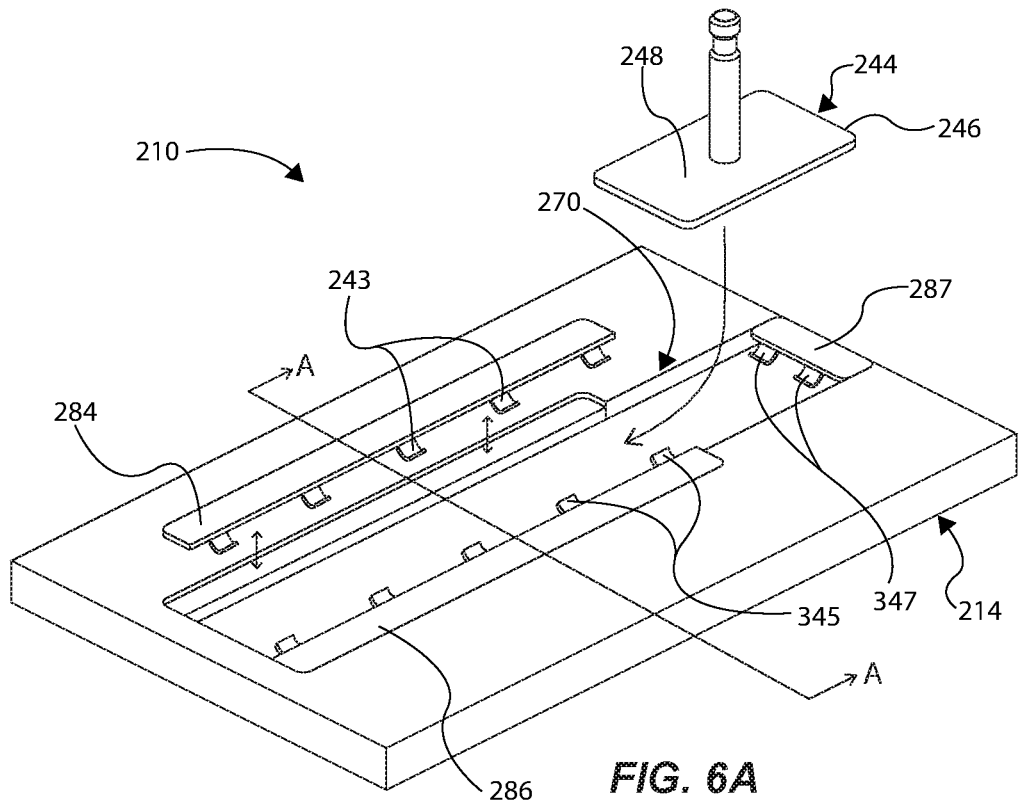
FIG. 6A illustrates an isometric view of the equipment mounting assembly of FIG. 3A comprising still another alternative position keep system in accordance with an example of the present disclosure.
Figure 6B:
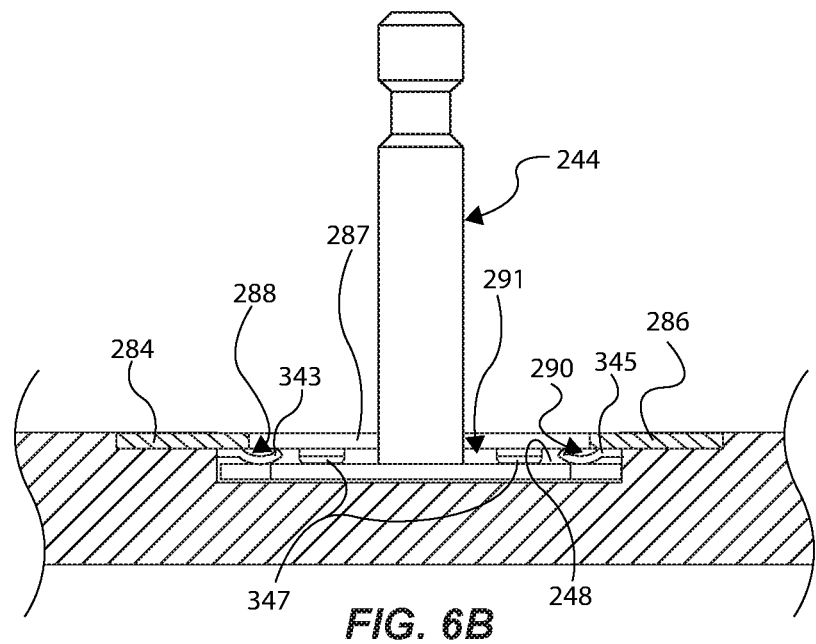
FIG. 6B illustrates a partial cross-sectional front view of the equipment mounting assembly of FIG. 6A (with the fixture mount shown in full), taken along section A-A.

FIGS. 6A-6B illustrate still another alternative exemplary position keeping system as part of the retention system 270. In this example, the position keeping system comprises a plurality of spring elements configured to apply a biasing force to the fixture mount 244 upon the fixture mount 244 being captured and secured to the mount support base 214 via the retention system 270. The spring elements can comprise a pre-determined spring constant, and the retention system 270 can comprise a resulting coefficient of static friction $\mu_s$. In one example, the spring elements can comprise a plurality of leaf-type spring members 343,345,347, such as shown. The plurality of spring members 343,345, 347 can be coupled or otherwise joined or secured to the underside of the first, second and/or third rails 284,286,287, respectively, at strategic locations, such that they extend downward into the respective capture channels 288,290,291, thus being positioned and configured to apply a biasing force to the fixture mount 244. Indeed, the spring members 343,345,347 can be sized and configured, such that they are compressed and elastically deflected a degree to apply the corresponding biasing force once the fixture mount 244 is captured and secured to the mount support base 214 within the retention system 270, wherein the biasing force is applied to the fixture mount 244 to facilitate maintenance of a selected position of the fixture mount 244 relative to the mount support base 214. The retention system 270 can therefore comprise a resulting first coefficient of static friction $\mu_{s1}$ between the spring members 343,345,347 and the first, second and/or third rails 284,286,287, and a second coefficient of static friction $\mu_{s2}$ between the fixture mount 244 and the mount support base 214.

In one aspect, the plurality of spring members 343,345, 347 can comprise a series of individual members on each rail, as shown. In another aspect, the plurality of spring members 343,345,347 can each comprise an elongate configuration that span substantially between the ends of the rails. The spring members 343,345,347 can be configured to permit the passage of the fixture mount 244 as it is captured within the retention system, this action functioning to also deflect the various spring members 343,345,347 as movement of the fixture mount 244 progresses. For example, the spring members 343,345,347 can each comprise a free segment (or free end) extending from a fixed segment (or fixed end) joined to the respective rails 284,286,287, the free segment comprising a curved configuration, such that as the fixture mount 244, and particularly its base plate 246, is captured, the edge of the base plate 246 clears the upturned edge or end of the free segment and contacts the underside of the curved underside of the free segment, wherein the base plate 246 deflects the free segment, and wherein a biasing force is applied. This process is continued until the fixture mount 244 is fully captured and seated within the retention system 270. In order to overcome the static friction and cause the fixture mount 244 to move or slide within the retention system 270, the $F_{max}$ of the retention system must be exceeded, $F_{max}$ being the product of the normal force acting on the fixture mount 244 and the greater of the first and second coefficients of static friction. Those skilled in the art will recognize that other configurations of spring members are contemplated, and therefore, those shown and discussed herein are not intended to be limiting in any way.

Figure 7A:
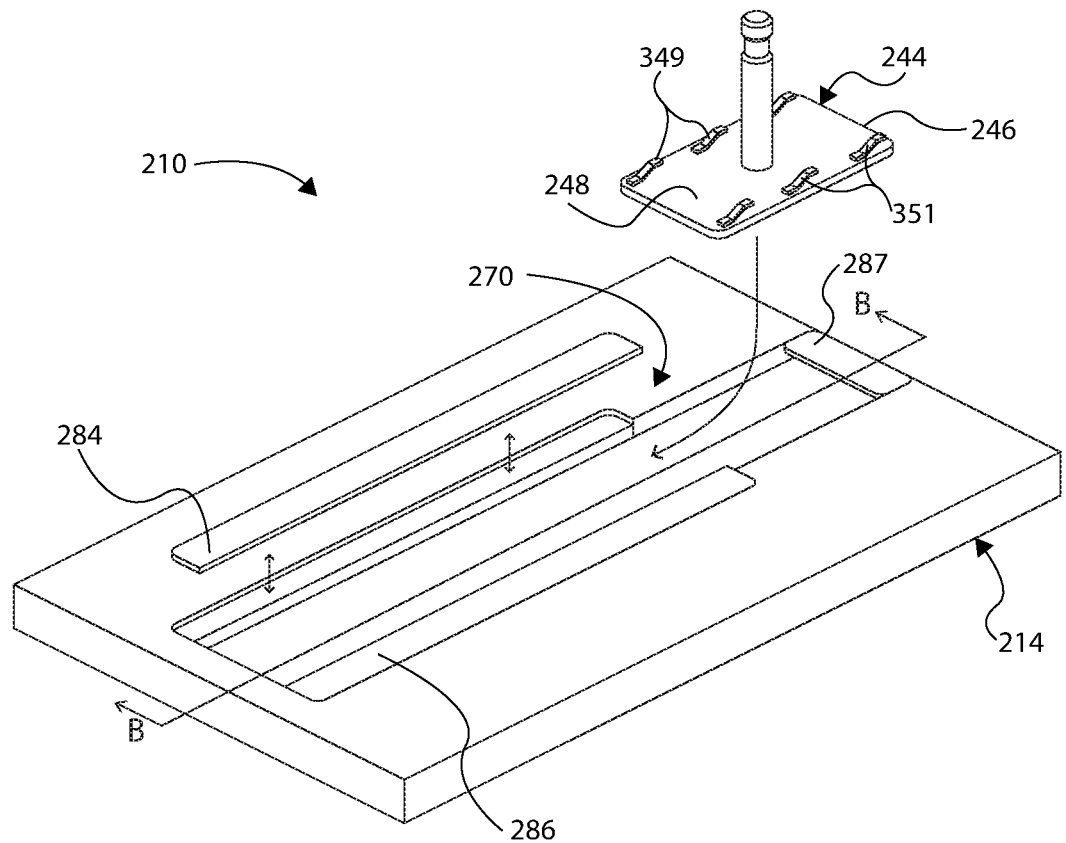
FIG. 7A illustrates an isometric view of the equipment mounting assembly of FIG. 3A comprising still another alternative position keep system in accordance with an example of the present disclosure.
Figure 7B:
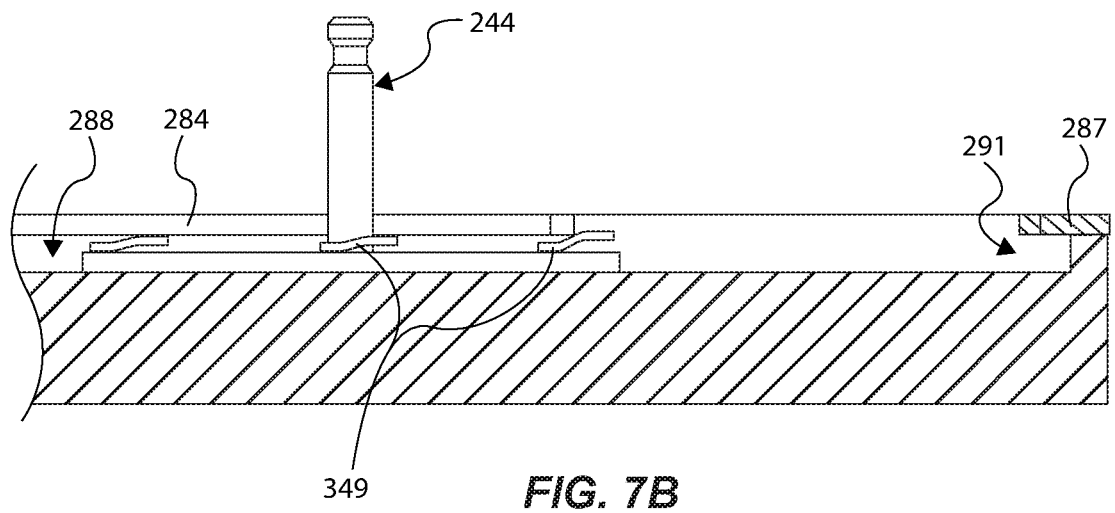
FIG. 7B illustrates a partial cross-sectional side view of the equipment mounting assembly of FIG. 7A (with the fixture mount shown in full), taken along section B-B.

FIGS. 7A and 7B illustrate an alternative exemplary position keeping system as part of the retention system 270. The position keeping system can comprise a plurality of spring elements configured to apply a biasing force to the fixture mount 244 upon the fixture mount 244 being captured and secured to the mount support base 214 via the retention system 270, similar to those shown in FIGS. 6A and 6B. However, in this example, the spring elements can comprise a plurality of leaf-type spring members 349,351 that can be coupled or otherwise secured or joined to the upper surface 248 of the base plate 246 of the fixture mount 244, such as by welding. The spring members 349,351 can be located at strategic locations about the upper surface 248, such that they extend upward into the respective capture channels (see capture channel 291)(capture channels 288, 290 not shown, but see FIG. 3B) to contact an underside of the rails 284,286, 287, respectively, once the fixture mount 244 is captured and secured within the retention system, wherein the spring members 349,351 are compressed and elastically deflected a degree to apply the biasing force to the fixture mount 244, thereby facilitating maintenance of a selected position of the fixture mount 244 relative to the mount support base 214. The spring members 349,351 can comprise a free segment extending upward from a fixed segment joined to the upper surface of the base plate 246 of the fixture mount 244. As the fixture mount 244 is inserted into the access opening and caused to engage the first, second and/or third rails 284,286,287, the free ends of the spring members 349,351 are deflected by the rails, wherein a biasing force is applied.

Other types of biasing elements that can be incorporated into the retention system 270 will be apparent to those skilled in the art. As such, those discussed herein are not intended to be limiting in any way.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An equipment mounting assembly for mounting and supporting a fixture, the equipment mounting assembly comprising:
    a mount support base;
    a fixture mount comprising a base plate defining a perimeter edge, and a mounting terminus supported by the base plate, the mounting terminus having a coupling interface for facilitating support of the fixture; and
    a retention system operable to releasably secure the fixture mount to the mount support base, the retention system comprising:
        a first rail mounted to the mount support base at a first position and orientation;
        a second rail mounted to the mount support base at a second position and orientation, and opposite the first rail;
        first and second capture channels defined at least in part by the mount support base and the first and second rails, respectively; and
        an access opening defined at least in part by the first and second rails, the access opening being sized smaller than a perimeter of the base plate of the fixture mount,
    wherein the mount support base further comprises a recess formed through an upper surface of the mount support base, the recess having a recess surface, and the recess further defining the first and second capture channels, and
    wherein the access opening and the first and second capture channels are operable together, such that the base plate of the fixture mount is removably insertable through the access opening into the recess and the first and second capture channels to cause the first and second rails to capture at least a portion of the base plate to secure the fixture mount to the mount support base.

2. The equipment mounting assembly of claim 1 wherein the first and second rails are supported by the mount support base to be above the recess surface, and wherein a portion of the first and second rails extend into the recess to at least partially define the first and second capture channels.

3. The equipment mounting assembly of claim 1, wherein the mount support base further comprises first and second shoulders formed in the upper surface of the mount support base adjacent the recess, and wherein the first and second rails are supported by the mount support base by the first and second shoulders, respectively, so as to be above the recess surface, and to be at least one of below or flush with the upper surface of the mount support base.

4. The equipment mounting assembly of claim 1, wherein the first and second rails are supported by the mount support base in spatially separated positions so as to define, at least in part, the access opening operable to receive the base plate of the fixture mount and to facilitate insertion of said portion of the base plate of the fixture mount into the first and second capture channels, and capture of the fixture mount by the first and second rails, the access opening being sized in one dimension, as defined by a length of the access opening, to be smaller than a length of the base plate of the fixture mount.

5. The equipment mounting assembly of claim 4, wherein at least one of the first or second capture channels and an associated one of the first or second rails are operable to initially receive said portion of the base plate of the fixture mount to permit passing of the remaining portion of the base plate of the fixture mount through the access opening.

6. The equipment mounting assembly of claim 1, wherein the retention system further comprises a position keep system operable to provide a force between the fixture mount and the mount support base with the fixture mount secured within the retention system, and to maintain a fixture support position of the fixture mount within the retention system relative to the mount support base.

7. The equipment mounting assembly of claim 6, wherein the position keep system comprises a biasing system operable to provide a biasing force between the fixture mount and the mount support base upon the fixture mount being releasably secured within the retention system.

8. The equipment mounting assembly of claim 7, wherein the biasing system comprises at least one magnet supported by the mount support base.

9. The equipment mounting assembly of claim 1, wherein the first and second rails and the first and second capture channels are situated opposite from one another.

10. The equipment mounting assembly of claim 1, wherein the first capture channel has a size greater than a size of the second capture channel, such that the base plate is rotatably insertable into the first and second capture channels in a first rotational direction, and removable from the first and second capture channels in only a second rotational direction opposite the first rotational direction.

11. The equipment mounting assembly of claim 1, wherein the first and second rails are supported by the mount support base opposite one another, and wherein the retention system further comprises a third rail supported by the mount support base and a third capture channel defined at least in part by the mount support base and the third rail, the third rail being offset from the first and second rails, and the first, second and third rails defining the access opening operable to receive the base plate of the fixture mount and to facilitate insertion of said portion of the base plate of the fixture mount into at least two of the first, second and third capture channels, and capture of the fixture mount by at least two of the first, second and third rails.

12. The equipment mounting assembly of claim 11, wherein the recess further defines the third capture channel, wherein the recess comprises a length greater than a length of the base plate of the fixture mount, such that the recess and the first and second capture channels are configured to receive the base plate and to facilitate movement of the base plate to selectively vary a fixture support position of the fixture mount relative to the mount support base with the fixture mount secured within the retention system.

13. The equipment mounting assembly of claim 12, wherein the mount support base further comprises first, second and third shoulders formed in the upper surface of the mount support base adjacent the recess, and wherein the first, second and third rails are supported by the mount support base by the first, second and third shoulders, respectively, so as to be above the recess surface, and to be at least one of below or flush with the upper surface of the mount support base.

14. The equipment mounting assembly of claim 11, wherein the third rail is supported by the mount support base to be above the recess surface, and wherein a portion of the first, second and third rails extend into the recess to at least partially define the first, second and third capture channels.

15. The equipment mounting assembly of claim 11, wherein the first and second capture channels and the first and second rails are operable to initially receive said portion of the base plate of the fixture mount to permit clearance of the third rail and passing of the remaining portion of the base plate of the fixture mount through the access opening.

16. The equipment mounting assembly of claim 11, wherein the first and second capture channels have a size greater than a size of the third capture channel, such that the base plate is rotatably insertable into the first, second and third capture channels in a first rotational direction, and removable from the first, second and third capture channels in a second rotational direction opposite the first rotational direction.

17. The equipment mounting assembly of claim 1, wherein the first and second capture channels comprise a length greater than a length of the base plate of the fixture mount, such that the first and second capture channels are configured to receive the base plate and to facilitate movement of the base plate to selectively vary a fixture support position of the fixture mount relative to the mount support base with the fixture mount secured within the retention system.

18. The equipment mounting assembly of claim 17, wherein the retention system further comprises a position keep system comprising at least one biasing element, the position keep system being operable to provide a force between the fixture mount and the mount support base with the fixture mount secured within the retention system, and to maintain any one of the selected fixture support positions of the fixture mount within the retention system relative to the mount support base.

19. The equipment mounting assembly of claim 18, wherein the fixture mount is moveable within the retention system relative to the mount support base to achieve any one of a plurality of fixture support positions by applying a pre-determined threshold friction force to the fixture mount to overcome the force and a corresponding coefficient of static friction provided by the position keep system.

20. The equipment mounting assembly of claim 1, wherein the recess comprises a length greater than a length of at least one of the first or second rails.

21. The equipment mounting assembly of claim 1, wherein the retention system comprises a fastenerless system for a releasable securing of the fixture mount to the mount support base.

22. The equipment mounting assembly of claim 1, wherein the first and second rails are formed integrally with the mount support base.

23. The equipment mounting assembly of claim 1, wherein the mount support base further comprises first and second shoulders formed in the upper surface of the mount support base adjacent the recess, and wherein the first and second rails are supported by the mount support base by the first and second shoulders, respectively, so as to be above the recess surface, and to be at least one of below or flush with the upper surface of the mount support base.

24. An equipment mounting assembly for mounting and supporting a fixture, the equipment mounting assembly, comprising:
 a mount support base; and
 a retention system operable to selectively and releasably secure a fixture mount to the mount support base, the retention system comprising:
  first and second rails supported by the mount support base, and defining, at least in part, an access opening; and
  first and second capture channels defined at least in part by a surface of the mount support base and the first and second rails, respectively,
  wherein the mount support base comprises a recess formed through an upper surface of the mount support base, the recess having a recess surface, and further defining the first and second capture channels, wherein the recess and the first and second capture channels are configured to receive a base plate of the fixture mount, and
  wherein the first and second rails are supported by the mount support base to be above the recess surface, and wherein a portion of the first and second rails extend into the recess to at least partially define the first and second capture channels.

25. The equipment mounting assembly of claim 24, wherein the first and second rails are supported about the mount support base in spatially separated positions so as to define, at least in part, the access opening operable to receive a base plate of the fixture mount and to facilitate insertion of said portion of the base plate of the fixture mount into the first and second capture channels, and capture of the fixture mount by the first and second rails, and wherein the access opening is sized in one dimension, as defined by a distance between opposing facing respective edges of the first and second rails in a direction perpendicular to at least one of the first and second rails, to be smaller than a corresponding dimension between opposing edges of the recess defining, at least in part, the first and second capture channels.

26. The equipment mounting assembly of claim 24, wherein at least one of the first or second capture channels and an associated one of the first or second rails are operable to initially receive said portion of the base plate of the fixture mount to permit passing of the remaining portion of the base plate of the fixture mount through the access opening.

27. The equipment mounting assembly of claim 24, further comprising the fixture mount, wherein the fixture mount is operable to be releasably retained within the retention system and releasably secured to the mount support base, the base plate of the fixture mount defining a perimeter edge, and the fixture mount further comprising a mounting terminus supported by the base plate, the mounting terminus having a coupling interface for facilitating support of the fixture.

28. The equipment mounting assembly of claim 24, wherein the retention system further comprises a position keep system operable to provide a force between the fixture mount and the mount support base with the fixture mount secured within the retention system, and to maintain a fixture support position of the fixture mount within the retention system relative to the mount support base.

29. The equipment mounting assembly of claim 28, wherein the position keep system comprises one or more biasing element operable to provide a biasing force between the fixture mount and the mount support base upon the fixture mount being releasably secured within the retention system.

30. The equipment mounting assembly of claim 29, wherein the biasing element comprises at least one magnet supported by the mount support base.

31. The equipment mounting assembly of claim 29, wherein the biasing element is situated between the base plate of the fixture mount and the first and second rails.

32. The equipment mounting assembly of claim 24, wherein the first rail and the associated first capture channel are situated opposite from the second rail and the associated second capture channel.

33. The equipment mounting assembly of claim 24, wherein the first capture channel has a size greater than a size of the second capture channel, such that a base plate of the fixture mount is rotatably insertable into the first and second capture channels in a first rotational direction, and removable from the first and second capture channels in only a second rotational direction opposite the first rotational direction.

34. The equipment mounting assembly of claim 24, wherein the first and second rails are supported by the mount support base opposite one another, and wherein the retention system further comprises a third rail supported by the mount support base and a third capture channel defined at least in part by the mount support base and the third rail, the third rail being offset from the first and second rails, and the first, second and third rails defining an access opening operable to receive the base plate of the fixture mount and to facilitate insertion of said portion of the base plate of the fixture mount into at least two of the first, second and third capture channels, and capture of the fixture mount by at least two of the first, second and third rails, the access opening being sized smaller in one dimension, as defined by a distance extending parallel to the first and second rails between respective ends of the first and second rails and an opposing edge of the third rail facing the respective ends of the first and second rails, than a corresponding parallel distance between opposing edges of the recess.

35. The equipment mounting assembly of claim 34, wherein the recess further defines the third capture channel, wherein the recess comprises a length greater than a length of the base plate of the fixture mount, such that the recess and the first and second capture channels are configured to receive the base plate and to facilitate movement of the base plate to selectively vary a fixture support position of the fixture mount relative to the mount support base with the fixture mount secured within the retention system.

36. The equipment mounting assembly of claim 34, wherein the third rail is supported by the mount support base to be above the recess surface, and wherein a portion of the first, second and third rails extend into the recess to at least partially define the first, second and third capture channels.

37. The equipment mounting assembly of claim 34, wherein the mount support base further comprises first, second and third shoulders formed in the upper surface of the mount support base adjacent the recess, and wherein the first, second and third rails are supported by the mount support base by the first, second and third shoulders, respectively, so as to be above the recess surface, and to be at least one of below or flush with the upper surface of the mount support base.

38. The equipment mounting assembly of claim 34, wherein the first and second capture channels and the first and second rails are operable to initially receive said portion of the base plate of the fixture mount to permit clearance of the third rail and passing of the remaining portion of the base plate of the fixture mount through the access opening.

39. The equipment mounting assembly of claim 24, wherein the recess, and the first and second capture channels comprise a length greater than a length of the base plate of the fixture mount, such that the first and second capture channels are configured to receive the base plate and to facilitate movement of the base plate to selectively vary a fixture support position of the fixture mount relative to the mount support base with the fixture mount secured within the retention system.

40. The equipment mounting assembly of claim 39, wherein the retention system further comprises a position keep system comprising one or more biasing elements, the position keep system being operable to provide a force between the fixture mount and the mount support base with the fixture mount secured within the retention system, and to maintain any one of the selected fixture support positions of the fixture mount within the retention system relative to the mount support base.

41. The equipment mounting assembly of claim 40, wherein the fixture mount is moveable within the retention system relative to the mount support base to achieve any one of a plurality of fixture support positions by applying a pre-determined threshold friction force to the fixture mount to overcome the force and a corresponding coefficient of static friction provided by the position keep system.

42. The equipment mounting assembly of claim 24, wherein the recess comprises a length greater than at least one of the first or second rails.

43. The equipment mounting assembly of claim 24, wherein the retention system comprises a fastenerless system for the releasable securing of the fixture mount to the mount support base.

44. The equipment mounting assembly of claim 24, wherein the first and second rails are formed integrally with the mount support base.

45. An equipment mounting assembly for mounting and supporting a fixture, the equipment mounting assembly comprising:
- a mount support base;
- a fixture mount comprising a base plate defining a perimeter edge, and a mounting terminus supported by the base plate, the mounting terminus having a coupling interface for facilitating support of the fixture; and
- a retention system operable to releasably secure the fixture mount to the mount support base, the retention system comprising:
  - a first rail mounted to the mount support base at a first position and orientation;
  - a second rail mounted to the mount support base at a second position and orientation, and opposite the first rail;
  - a third rail supported by the mount support base and a third capture channel defined at least in part by the mount support base and the third rail, the third rail being offset from the first and second rails
  - first and second capture channels defined at least in part by the mount support base and the first and second rails, respectively; and
  - an access opening defined at least in part by the first, and second, and third rails, the access opening being sized smaller than a perimeter of the base plate of the fixture mount, and operable to receive the base plate of the fixture mount and to facilitate insertion of at least a portion of the base plate of the fixture mount into at least two of the first, second and third capture channels, and capture of the fixture mount by at least two of the first, second and third rails,
  wherein the access opening and the first and second capture channels are operable together, such that the base plate of the fixture mount is removably insertable through the access opening into the first and second capture channels to cause the first and second rails to capture said portion of the base plate to secure the fixture mount to the mount support base.

46. An equipment mounting assembly for mounting and supporting a fixture, the equipment mounting assembly, comprising:
- a mount support base; and
- a retention system operable to selectively and releasably secure a fixture mount to the mount support base opposite one another, the retention system comprising:
  - first, second and third rails supported by the mount support base, and defining, at least in part, an access opening, the third rail being offset from the first and second rails; and
  - first, second and third capture channels defined at least in part by a surface of the mount support base and the first, second and third rails, respectively,
  wherein the access opening is operable to receive a base plate of the fixture mount and to facilitate insertion of at least a portion of the base plate of the fixture mount into at least two of the first, second and third capture channels, and capture of the fixture mount by at least two of the first, second and third rails, the access opening being sized smaller in one dimension, as defined by a distance extending parallel to the first and second rails between respective ends of the first and second rails and an opposing edge of the third rail facing the respective ends of the first and second rails, than a corresponding parallel distance between the third capture channel and at least one of the first or second capture channels.

* * * * *